(12) United States Patent
Tanaka

(10) Patent No.: US 10,541,568 B2
(45) Date of Patent: Jan. 21, 2020

(54) POWER TRANSMISSION DEVICE FOR WIRELESSLY TRANSMITTING ELECTRIC POWER TO POWER RECEPTION DEVICE, CONTROL METHOD FOR POWER TRANSMISSION DEVICE, AND RECORDING MEDIUM

(71) Applicant: CANON KABUSHIKI KAISHA, Tokyo (JP)

(72) Inventor: Nobuhiko Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 16/014,929

(22) Filed: Jun. 21, 2018

(65) Prior Publication Data

US 2019/0006890 A1 Jan. 3, 2019

(30) Foreign Application Priority Data

Jun. 28, 2017 (JP) .................................. 2017-126237

(51) Int. Cl.
*H02J 50/80* (2016.01)
*H02J 7/02* (2016.01)
*H02J 7/00* (2006.01)

(52) U.S. Cl.
CPC .............. *H02J 50/80* (2016.02); *H02J 7/025* (2013.01); *H02J 2007/005* (2013.01); *H02J 2007/0049* (2013.01)

(58) Field of Classification Search
CPC .............. H02J 50/80; H02J 50/50; H02J 7/025
See application file for complete search history.

(56) References Cited

U.S. PATENT DOCUMENTS

| | | | | |
|---|---|---|---|---|
| 8,639,391 B1* | 1/2014 | Alberth, Jr. | ............ | G05B 15/02 340/657 |
| 8,965,278 B2* | 2/2015 | Takayama | ............ | H04B 5/0031 455/41.1 |
| 9,712,068 B2* | 7/2017 | Suzuki | .................... | H02M 5/02 |
| 9,888,442 B2* | 2/2018 | Tsukamoto | ....... | H04W 52/0235 |
| 10,037,743 B2* | 7/2018 | Zeine | .................... | H04W 4/023 |

FOREIGN PATENT DOCUMENTS

JP 2009-148108 A 7/2009

* cited by examiner

*Primary Examiner* — Richard V Muralidar
(74) *Attorney, Agent, or Firm* — Canon U.S.A., Inc. IP Division

(57) ABSTRACT

A power transmission device includes a power transmission unit configured to transmit electric power to a plurality of power reception devices, a communication unit configured to exchange charging information with the plurality of power reception devices, a determination unit configured to determine based on the charging information, for each of the plurality of power reception devices, whether the power reception device is capable of limiting power reception, a detection unit configured to detect based on the charging information, for each of the plurality of power reception devices, completion of charging of the power reception device, and a control unit configured to perform control so that power transmission is stopped in a case where the detection unit detects that at least one power reception device incapable of limiting power reception has completed charging.

10 Claims, 21 Drawing Sheets

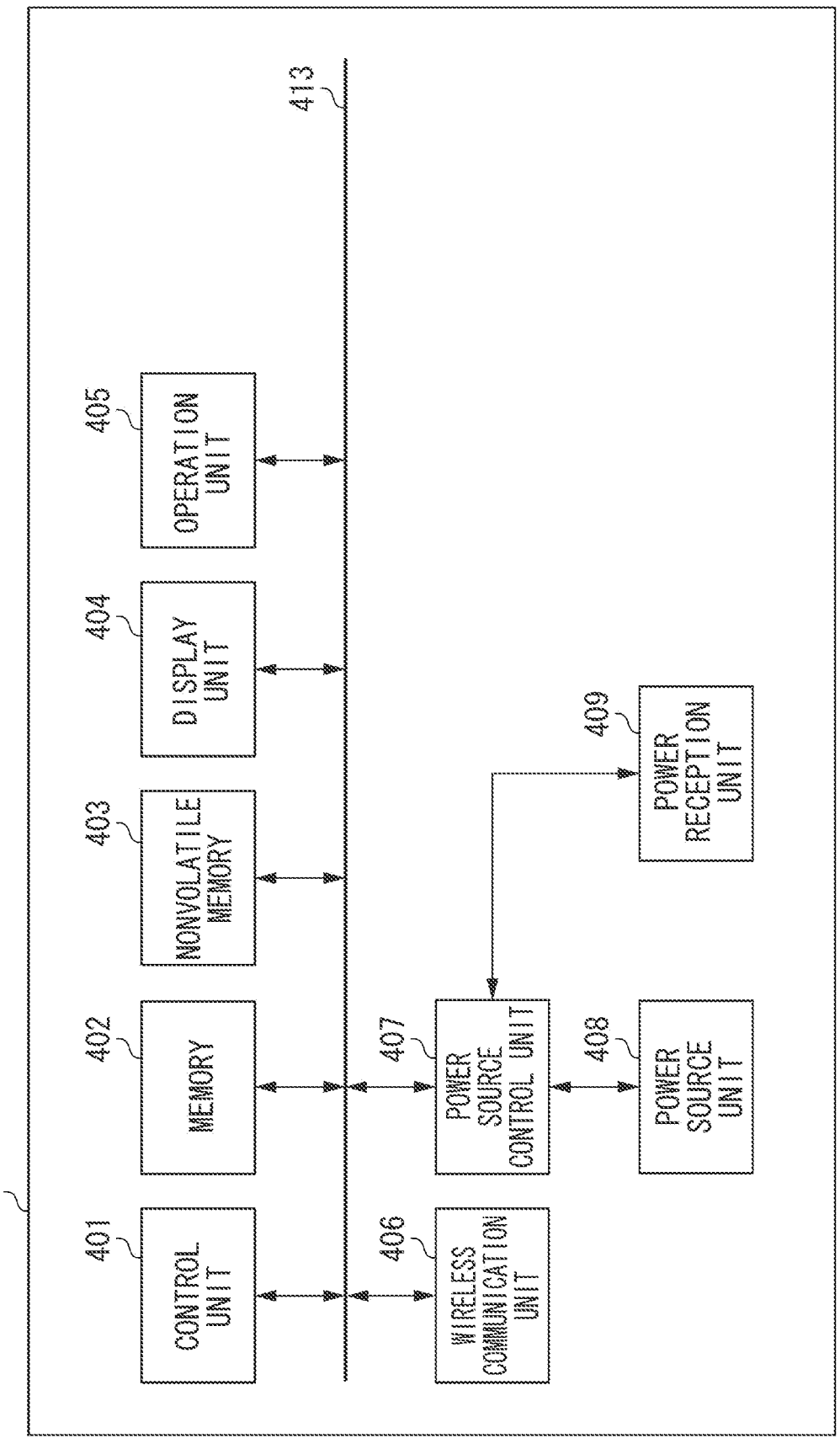

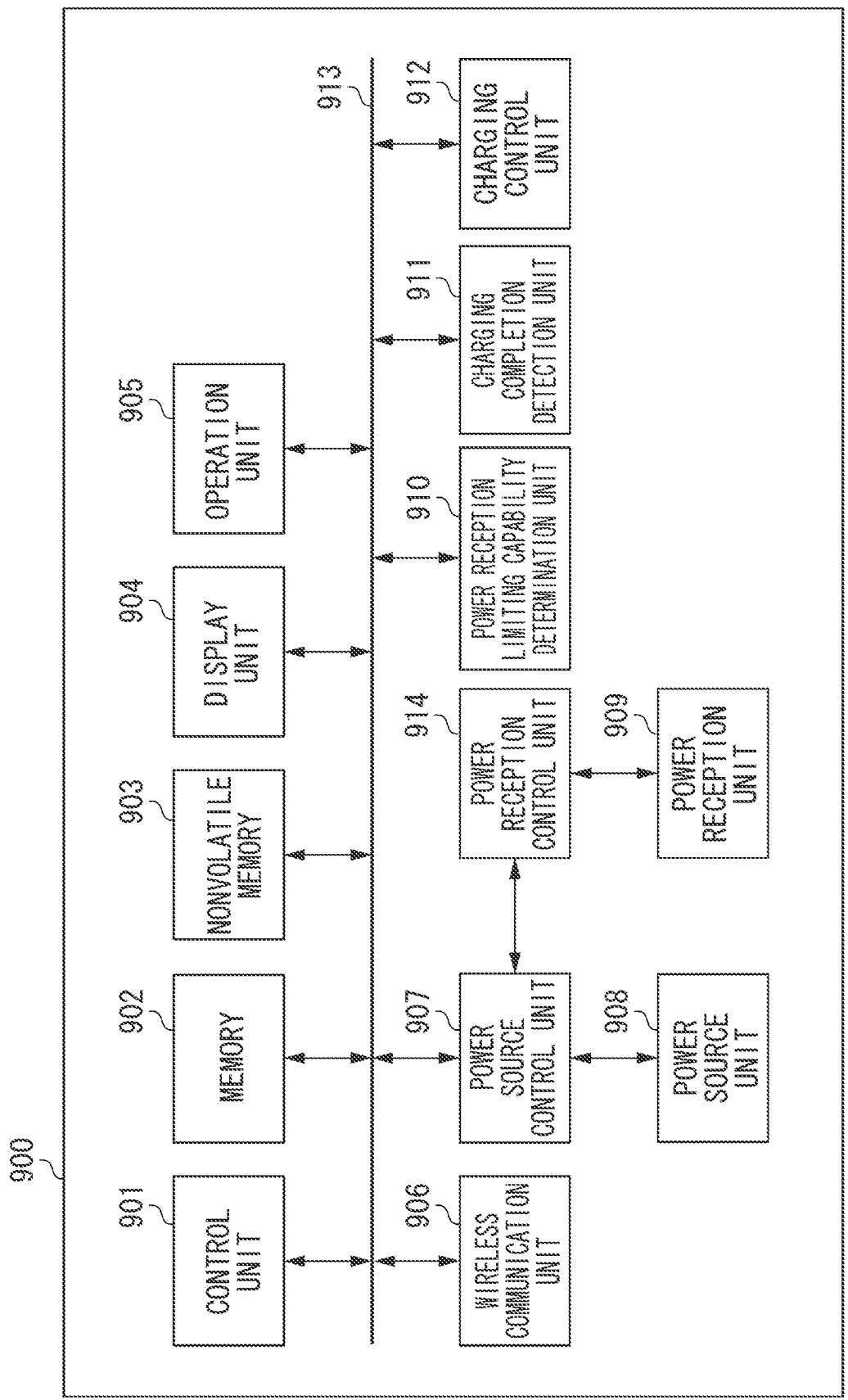

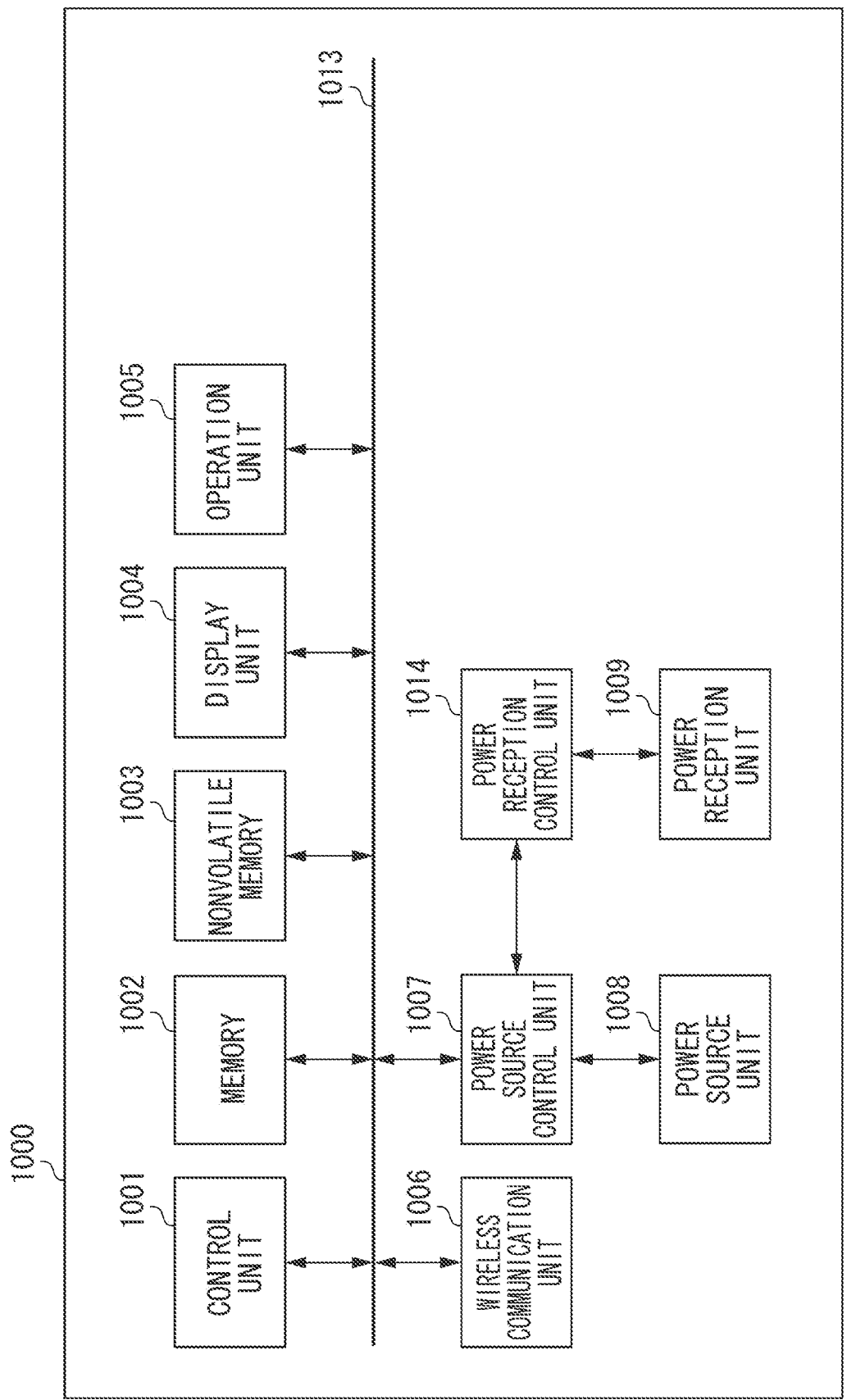

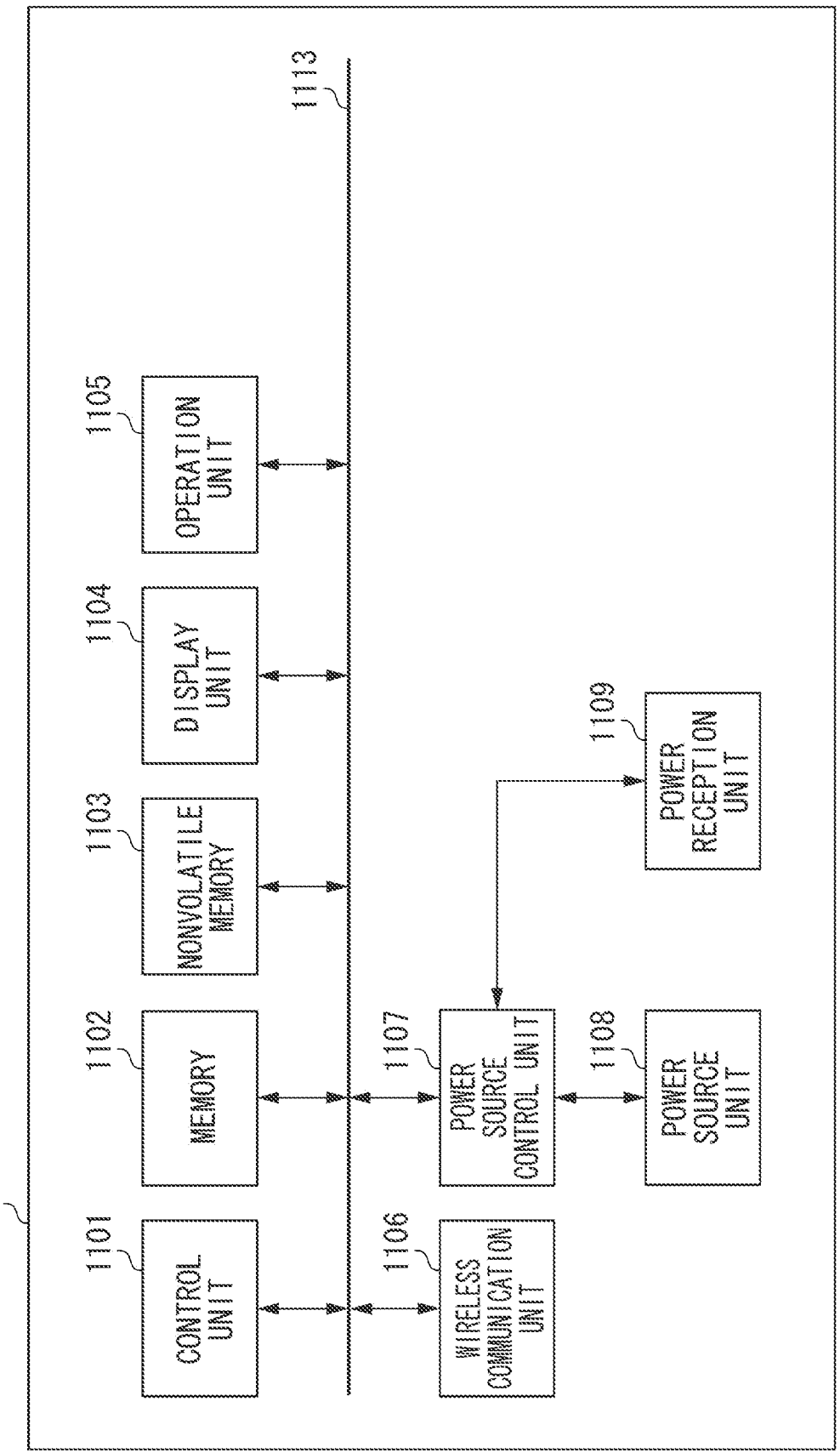

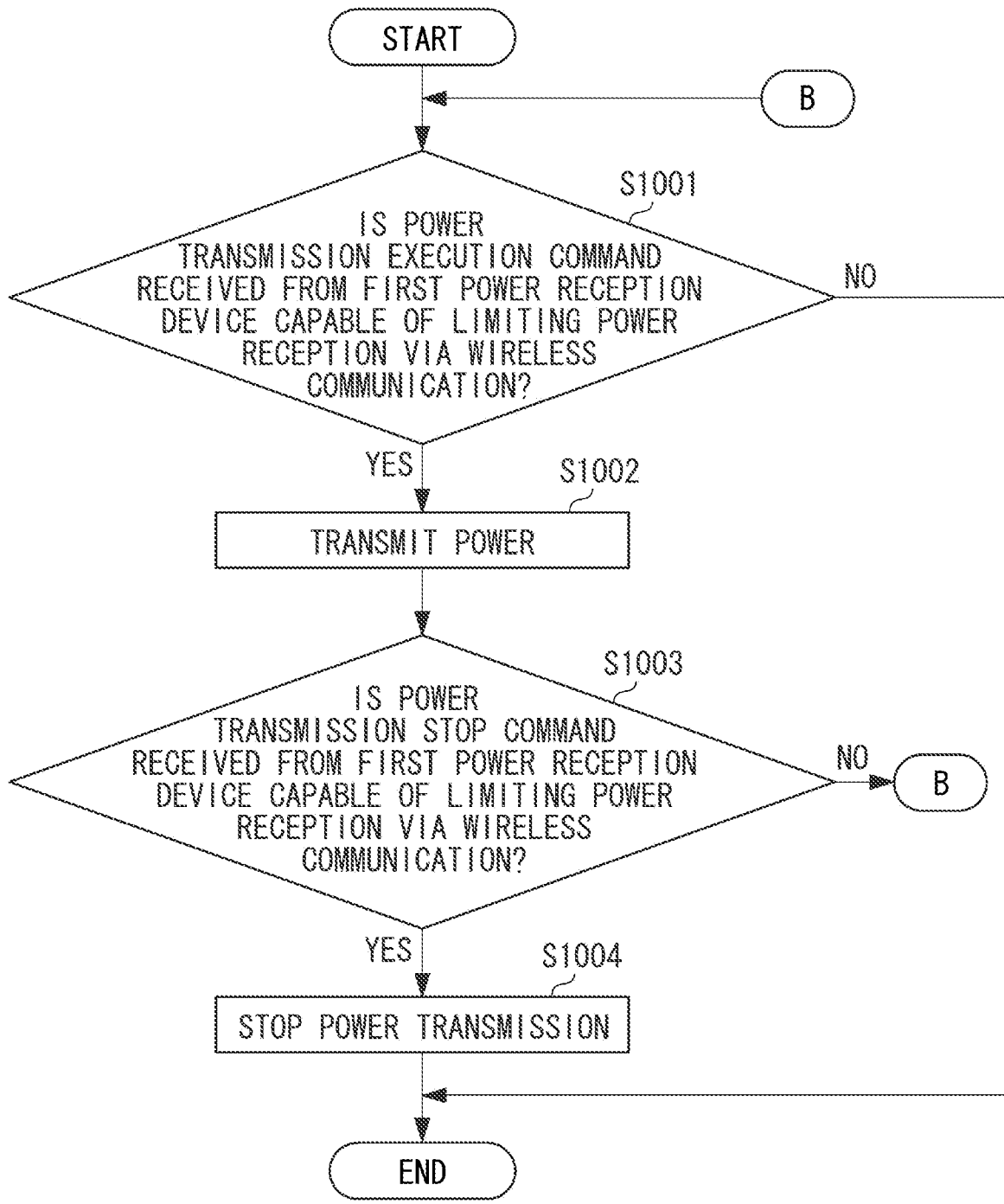

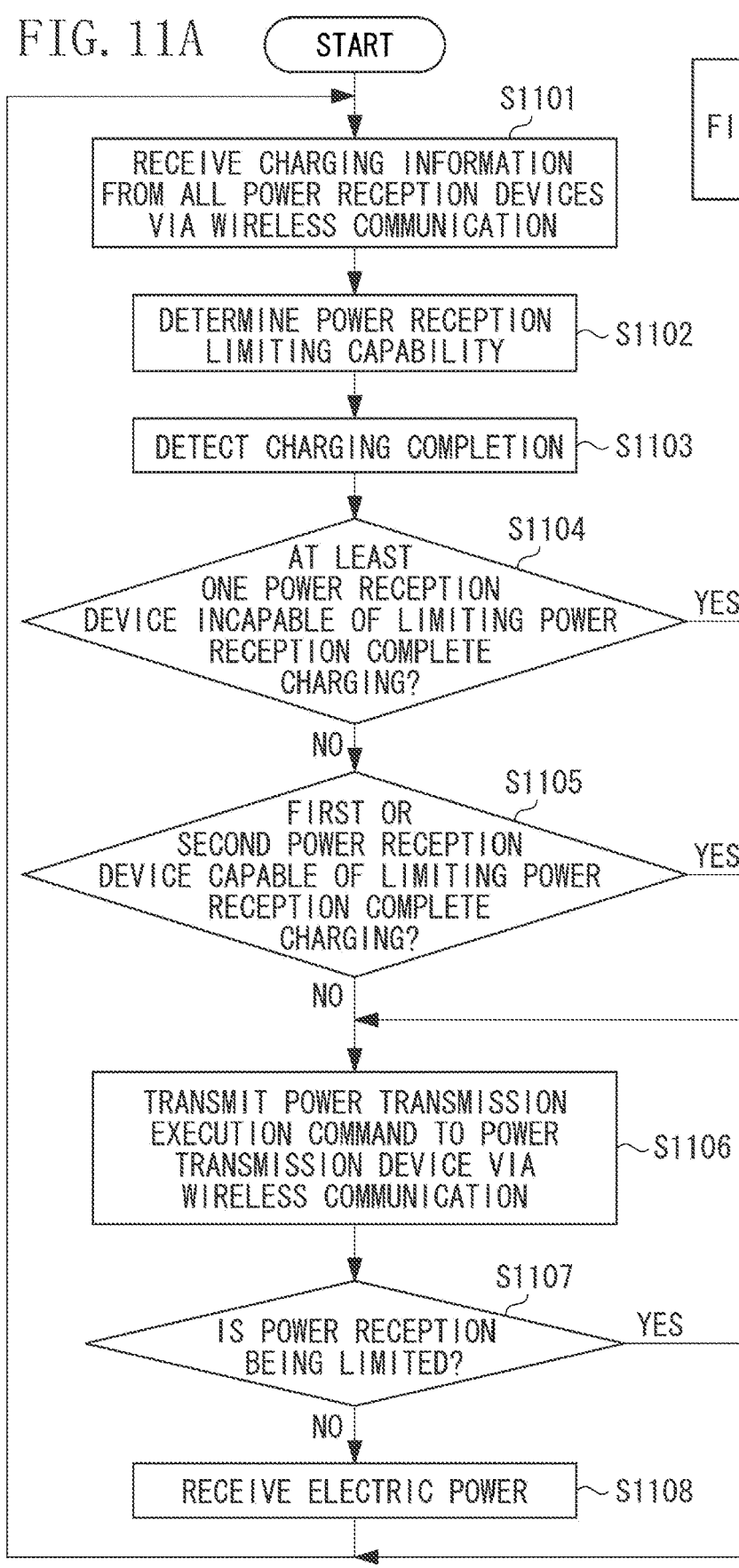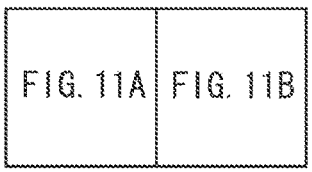

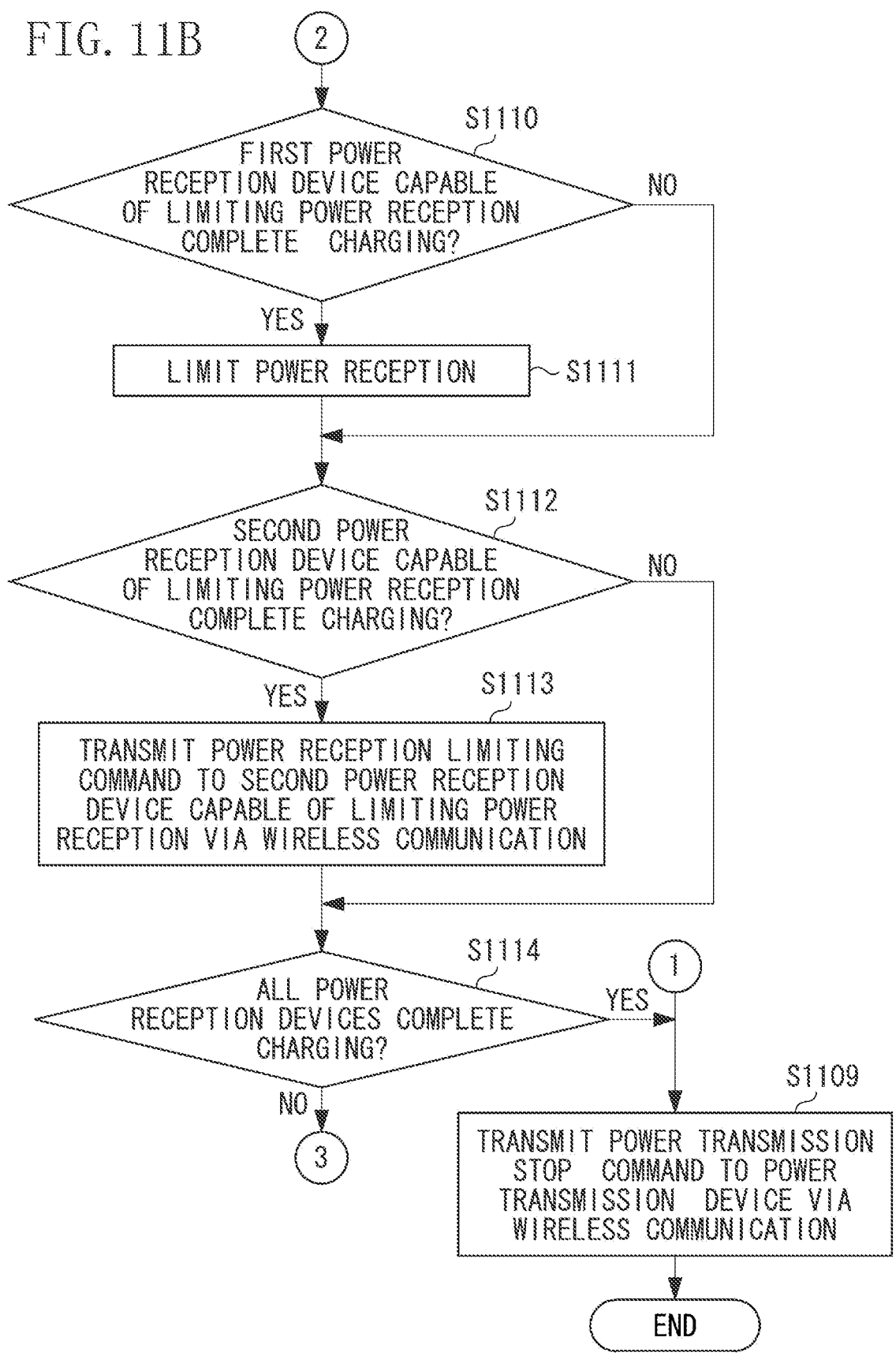

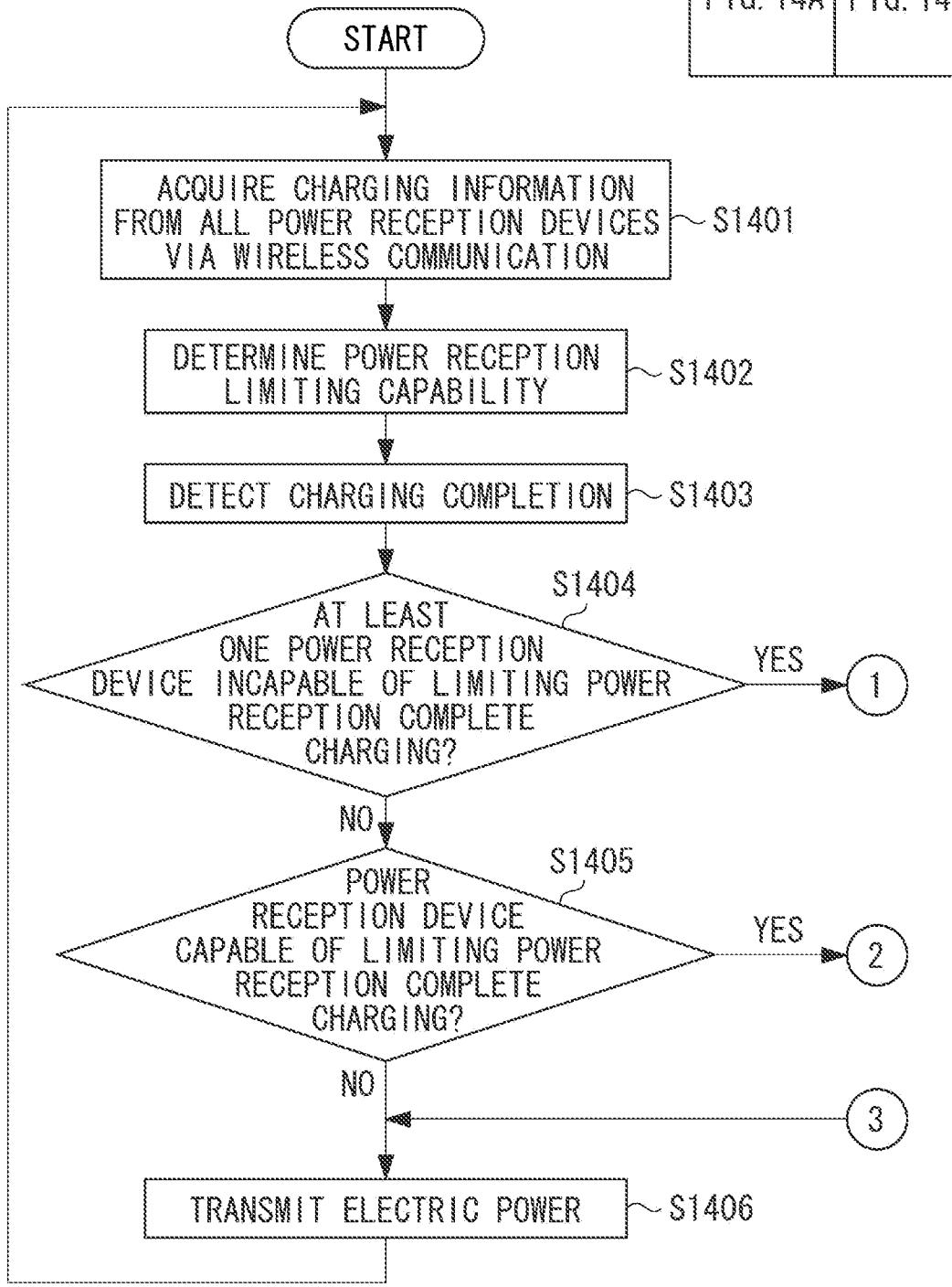

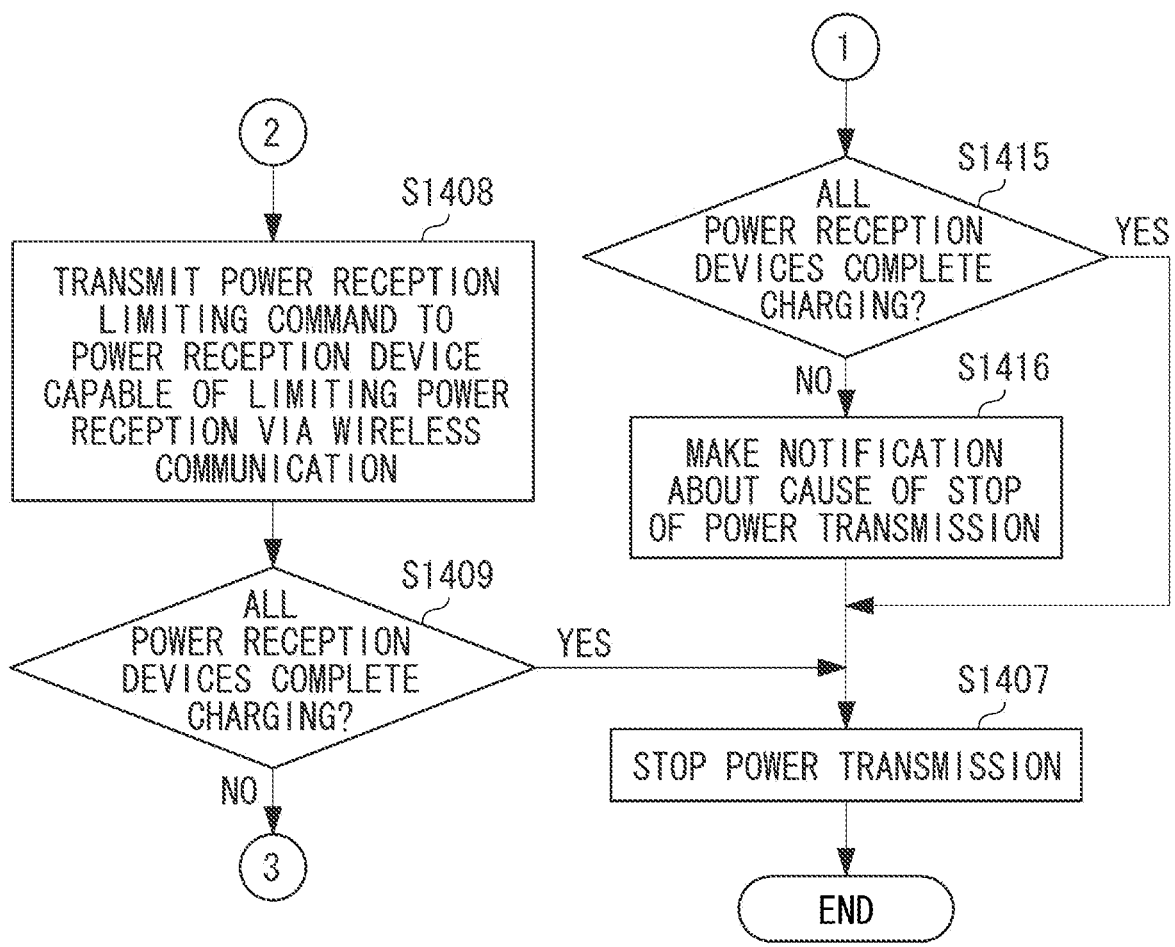

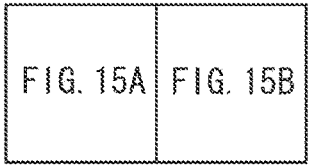
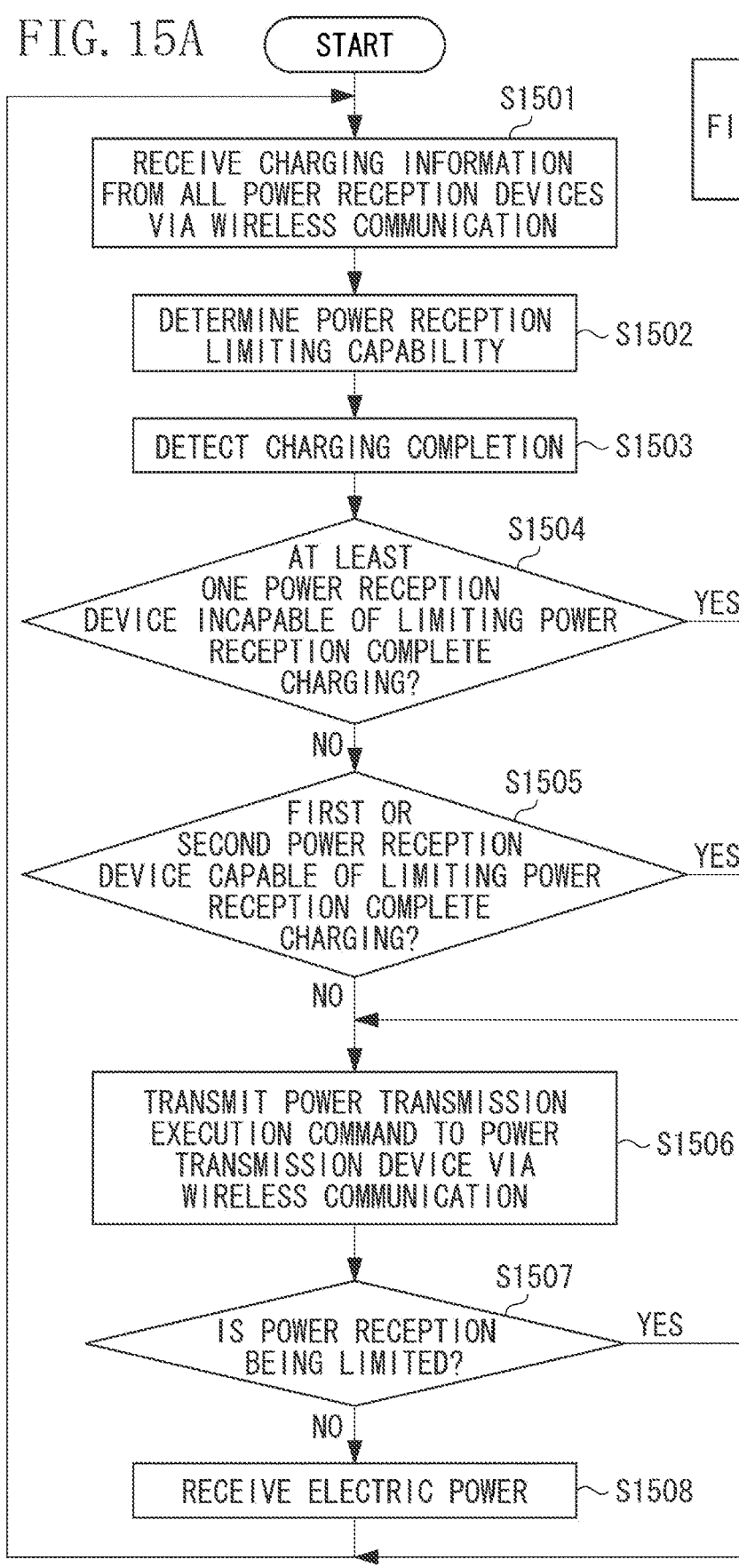
FIG. 15A

POWER TRANSMISSION DEVICE FOR WIRELESSLY TRANSMITTING ELECTRIC POWER TO POWER RECEPTION DEVICE, CONTROL METHOD FOR POWER TRANSMISSION DEVICE, AND RECORDING MEDIUM

BACKGROUND

Field

The present disclosure relates to a power transmission device that can wirelessly transmit electric power to a plurality of power reception devices.

Description of the Related Art

Conventionally, there exists a wireless charging system in which a power transmission device wirelessly transmits electric power to a power reception device having a secondary battery (storage battery) to perform charging of the secondary battery. As a power transmission method, a magnetic resonance method utilizing an electromagnetic resonance phenomenon is known. In the wireless charging system using the magnetic resonance method, one power transmission device can simultaneously charge a plurality of power reception devices (hereinafter, referred to as multiple device charging).

For example, Japanese Patent Application Laid-Open No. 2009-148108 discusses a wireless charging system that performs multiple device charging. When a first power reception device completes charging, electric power received by the charged first power reception device is distributed as electric power to be transmitted to another power reception device. This occurs due to a feature of the charged power reception device which limits the electric power it receives. Therefore, electric power to be transmitted by the first power reception device to another power reception device is reduced by an amount of the electric power received by the first power reception device. This prevents an excessive charging current from being supplied to another power reception device.

The power reception devices include a power reception device capable of limiting power reception by having a function for limiting electric power to be received, and a power reception device incapable of limiting power reception and not having the function for limiting electric power to be received. For this reason, in a multiple device charging situation, there can arise a case where a power reception device capable of limiting power reception and a power reception device incapable of limiting power reception coexist. In this case, in the conventional technology discussed in Japanese Patent Application Laid-Open No. 2009-148108, charging control might not be suitably performed due to the following reason. That is, the power reception device incapable of limiting power reception may continue receiving electric power even after the completion of charging of the power reception device's battery. For this reason, if the power transmission device continues power transmission, electric power received by the power reception device incapable of limiting power reception is not charged into a secondary battery (storage battery) and the electric power transforms into heat. As a result, a rise in temperature that could cause adverse effects on the power reception device might occur. Further, electric power that is received by the power reception device incapable of limiting power reception that has completed charging continues to be received the power reception device even after the completion of charging for that power reception device. Accordingly, this electric power which could be distributed as electric power to be transmitted to another power reception device is wasted. Therefore, if electric power to be transmitted is reduced by the amount corresponding to the electric power that had been received by the power reception device incapable of limiting power reception after it has completed charging, electric power to be received by another power reception device is reduced. For this reason, the time required for completion of charging for the multiple devices becomes longer.

SUMMARY

According to various embodiments of the present disclosure, a power transmission device includes a power transmission unit configured to transmit electric power to a plurality of power reception devices, a communication unit configured to exchange charging information with the plurality of power reception devices, a determination unit configured to determine, based on the charging information, for each of the plurality of power reception devices, whether the power reception device is capable of limiting power reception, a detection unit configured to detect, based on the charging information, for each of the plurality of power reception devices, completion of charging of the power reception device, and a control unit configured to perform control so that power transmission is stopped in a case where the detection unit detects that at least one power reception device incapable of limiting power reception has completed charging.

Further features will become apparent from the following description of exemplary embodiments with reference to the attached drawings.

BRIEF DESCRIPTION OF THE DRAWINGS

FIGS. 3A and 3B are block diagrams illustrating configurations of a power reception device according to the first exemplary embodiment.

FIGS. 9A, 9B, and 9C are block diagrams illustrating configurations of the power reception device according to the second exemplary embodiment.

FIG. 10 is a flowchart illustrating charging control of the power transmission device according to the second exemplary embodiment.

FIG. 11 (including FIG. 11A and FIG. 11B) is a flowchart illustrating charging control of a first power reception device capable of limiting power reception according to the second exemplary embodiment.

FIG. 14 (including FIG. 14A and FIG. 14B) is a flowchart illustrating charging control of the power transmission device according to a third exemplary embodiment.

DESCRIPTION OF THE EMBODIMENTS

Exemplary embodiments of the present disclosure will be described below with reference to the drawings.

A first exemplary embodiment will describe an example of multiple device charging for a case where a power reception device capable of limiting power reception and a power reception device incapable of limiting power reception coexist in a system. In this example, a power transmission device controls charging of a wireless charging system.

Figure 1:
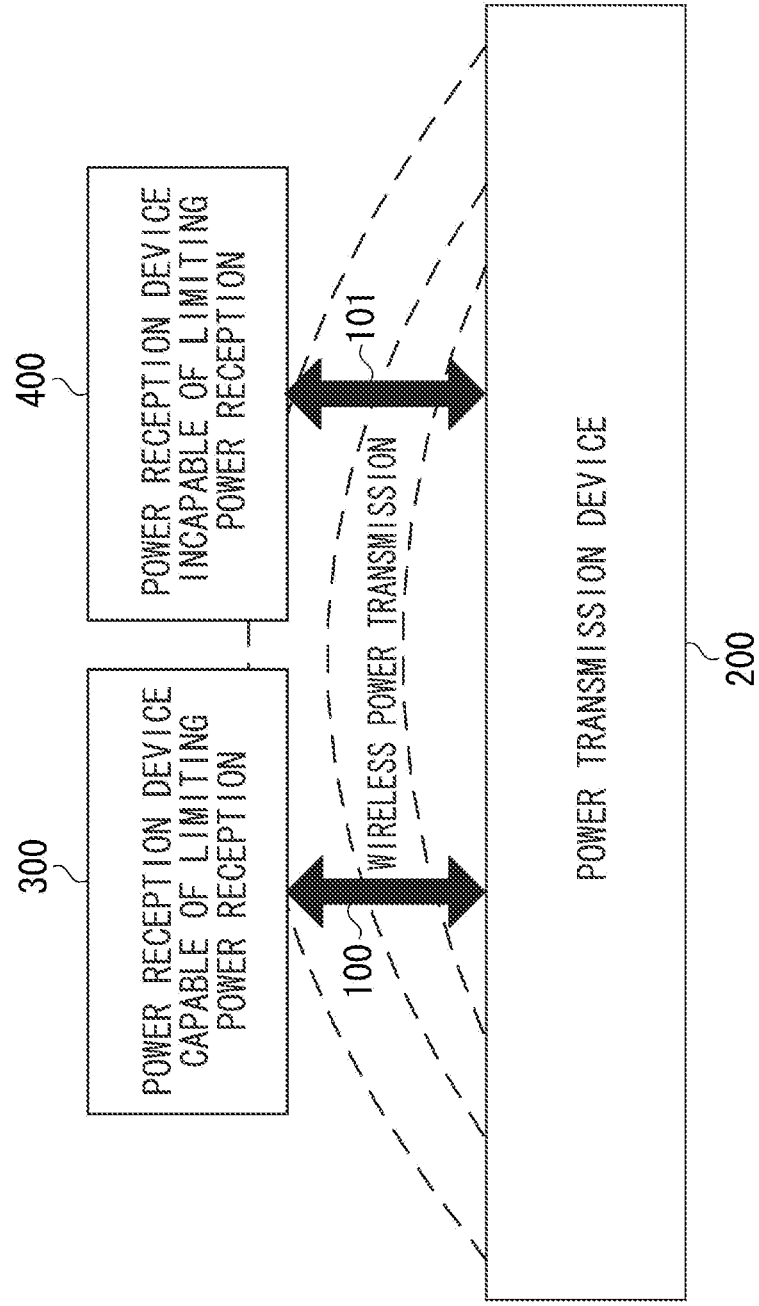
FIG. 1 is a diagram illustrating charging control of a wireless charging system according to a first exemplary embodiment.

FIG. 1 is a diagram illustrating charging control of the wireless charging system according to the first exemplary embodiment.

The wireless charging system includes a power transmission device 200, a power reception device 300 capable of limiting power reception, and a power reception device 400 incapable of limiting power reception. The power reception device 300 has a function for limiting electric power to be received. The power reception device 400 does not have the function for limiting electric power to be received. FIG. 1 illustrates, as one example, a case where one power reception device 300 capable of limiting power reception and one power reception device 400 incapable of limiting power reception are provided. However, numbers of the respective devices may be one or more. The power transmission device 200 can wirelessly transmit electric power to the power reception device 300 capable of limiting power reception and the power reception device 400 incapable of limiting power reception to simultaneously charge the devices.

As a power transmission method, for example, a magnetic resonance method utilizing an electromagnetic resonance phenomenon is used. The power transmission device 200 transmits and receives charging information to and from the power reception device 300 capable of limiting power reception via wireless communication 100 to detect whether the charging is completed. Further, the power transmission device 200 transmits and receives the charging information to and from the power reception device 400 incapable of limiting power reception via wireless communication 101 to detect whether the charging is completed. When the power transmission device 200 detects that at least one power reception device 400 incapable of limiting power reception has completed charging, the power transmission device 200 stops power transmission. Further, when the power transmission device 200 detects that the charging of the power reception device 300 capable of limiting power reception has been completed, the power transmission device 200 transmits a power reception limiting command to the power reception device 300 capable of limiting power reception via the wireless communication 100 and limits the power reception of the power reception device 300 capable of limiting power reception.

Figure 2:
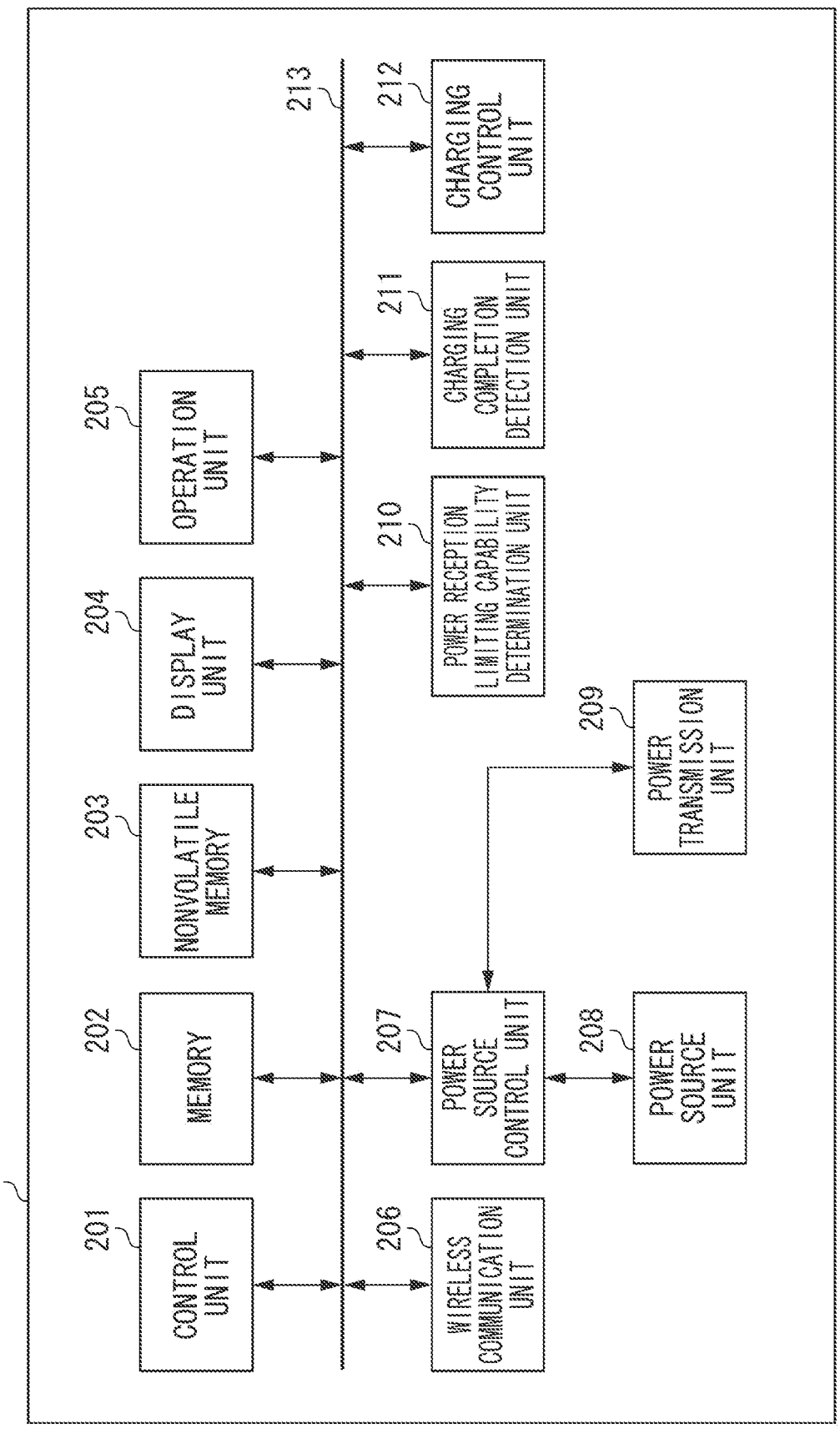
FIG. 2 is a block diagram illustrating a configuration of a power transmission device according to the first exemplary embodiment.

FIG. 2 is a block diagram illustrating a configuration of the power transmission device 200 according to the first exemplary embodiment.

In the power transmission device 200, respective units are connected to an internal bus 213, and the respective units can transmit and receive data each other via the internal bus 213.

A control unit 201 controls the respective units of the power transmission device 200 in accordance with programs stored in a nonvolatile memory 203 by using a memory 202 as a working memory. The memory 202 is, for example, a random-access memory (RAM) such as a volatile memory or the like using semiconductor elements. The nonvolatile memory 203 is an electrically erasable and recordable memory, such as an electrically erasable programmable read-only memory (EEPROM). The nonvolatile memory 203 stores various data, various programs for operating the control unit 201. The programs are programs for executing various flowcharts, described below, in the present exemplary embodiment.

A display unit 204 displays an image and a graphical user interface (GUI) screen configuring GUI, based on control by the control unit 201. The control unit 201 controls the respective units of the power transmission device 200 in such a manner that a display control signal is generated in accordance with a program, a video signal to be displayed on the display unit 204 is generated so as to be output to the display unit 204. The display unit 204 displays a picture based on the output video signal.

An operation unit 205 is an input device for accepting a user's operation including a pointing device such as a touch panel, a button, a dial, and a touch sensor. The touch panel is an input device configured two-dimensionally so as to be overlapped with the display unit 204. Coordinate information according to a touched position is output from the touch panel.

A wireless communication unit 206 includes an antenna, a wireless transmission unit, and a wireless reception unit. The wireless transmission unit and the wireless reception unit transmit and receive processing commands, processing responses, and various data as wireless signals via the antenna. Further, the wireless communication unit 206 transmits and receives charging information to and from the power reception device 300 capable of limiting power reception and the power reception device 400 incapable of limiting power reception via wireless communication. As a wireless communication standard, for example, Bluetooth (registered tradename) is used.

A power source control unit 207 includes a battery detection circuit, a direct current to direct current (DC-DC) converter, and a switch circuit that switches a block to be energized. The power source control unit 207 detects a remaining battery level, determines whether a battery is attached, and discriminates a type of a battery. Further, the power source control unit 207 controls the DC-DC converter based on detected results and an instruction from the control unit 201, and supplies a necessary voltage to the respective units for a necessary period.

A power source unit 208 includes a primary battery such as an alkaline cell or a lithium cell, a secondary battery (storage battery) such as a nickel-cadmium (NiCd) battery, a nickel metal hydride (NiMH) battery, or a lithium (Li) battery, and an alternating current (AC) adaptor.

A power transmission unit 209 includes a power supply circuit that supplies electric power form the power source control unit 207, and a power transmission coil. The power transmission unit 209 wirelessly transmits electric power to the power reception device 300 capable of limiting power reception and the power reception device 400 incapable of limiting power reception, based on control by the power source control unit 207. As a wireless charging standard, for example, Alliance For Wireless Power (A4WP) is used.

A power reception limiting capability determination unit 210 is a determination unit that refers to charging information of the power reception device 300 capable of limiting power reception and the power reception device 400 incapable of limiting power reception received by the wireless communication unit 206 to determine whether the power reception devices are incapable or capable of limiting power reception.

A charging completion detection unit 211 is a detection unit that refers to the charging information of the power reception device 300 capable of limiting power reception and the power reception device 400 incapable of limiting power reception received by the wireless communication unit 206 to detect that the power reception devices complete charging.

A charging control unit 212 controls charging of the wireless charging system. The charging control unit 212 refers to a detection result of the charging completion detection unit 211. If detecting that at least one power reception device 400 incapable of limiting power reception has completed charging, the charging control unit 212 controls the power source control unit 207 so that the power transmission is stopped. Further, if detecting that the power reception device 300 capable of limiting power reception has completed charging, the charging control unit 212 transmits a power reception limiting command to the power reception device 300 capable of limiting power reception via the wireless communication unit 206 to limit power reception of the power reception device 300 capable of limiting power reception.

Figure 3A:
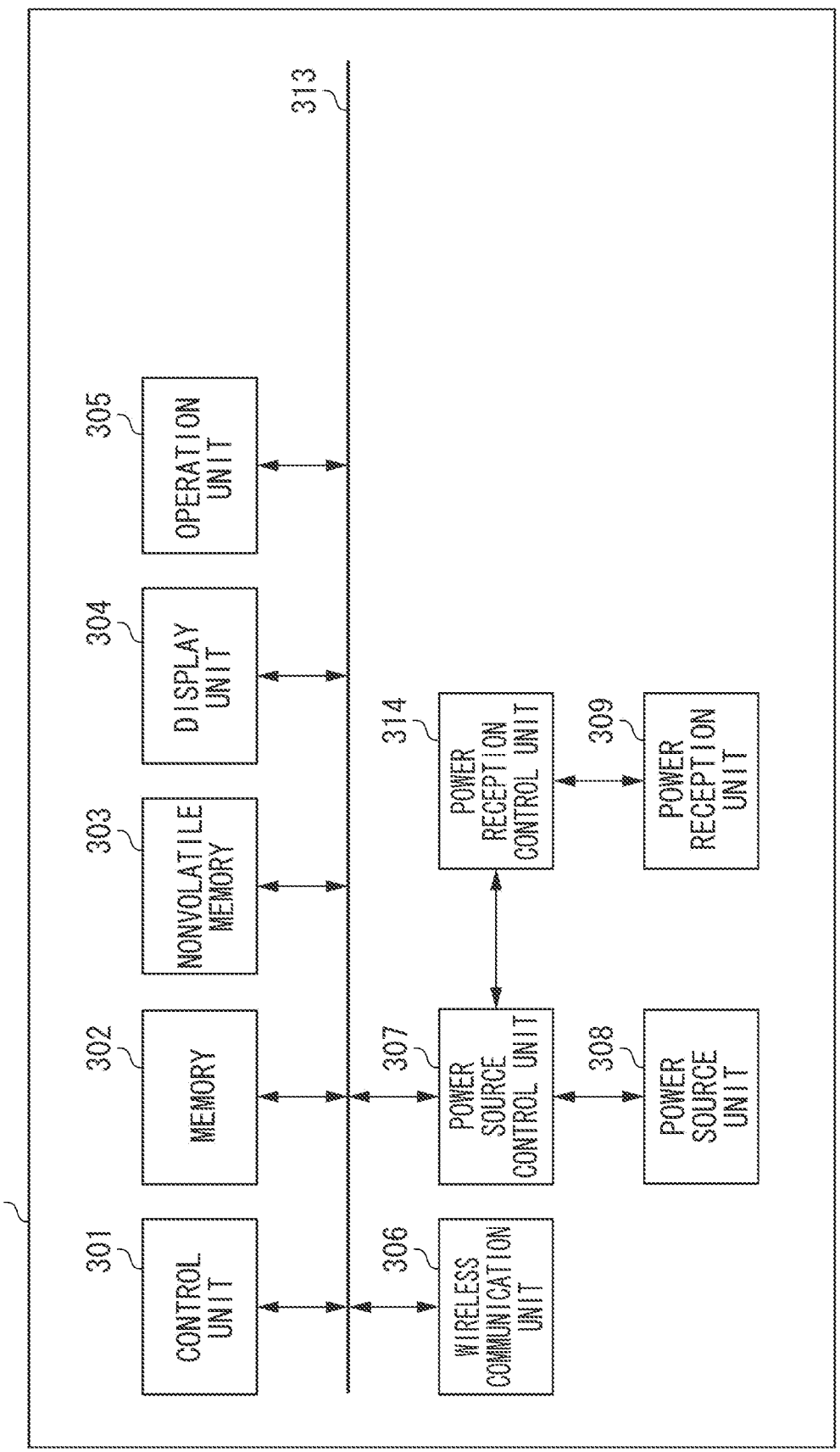

FIGS. 3A and 3B are block diagrams illustrating configurations of the power reception device according to the first exemplary embodiment. FIG. 3A illustrates the configuration of the power reception device 300 capable of limiting power reception.

The power reception device 300 capable of limiting power reception includes a control unit 301, a memory 302, a nonvolatile memory 303, a display unit 304, an operation unit 305, and an internal bus 313. The respective units have functions similar to functions of the control unit 201, the memory 202, the nonvolatile memory 203, the display unit 204, the operation unit 205, and the internal bus 213 in FIG. 2. Description thereof is thus omitted. Only a difference from the power transmission device 200 in FIG. 2 will be described.

A wireless communication unit 306 has a function similar to a function of the wireless communication unit 206 in FIG. 2, and transmits and receives charging information to and from the power transmission device 200 via wireless communication.

A power source control unit 307 has a function similar to a function of the power source control unit 207 in FIG. 2, and controls a power reception unit 309. The power source control unit 307 supplies electric power received from the power transmission device 200 by the power reception unit 309 to a power source unit 308 so as to perform charging.

The power source unit 308 is a secondary battery (storage battery) such as a nickel-cadmium (NiCd) battery, a NiMH battery, or a Li battery. The power source unit 308 can be charged with electric power supplied from the power transmission device 200.

The power reception unit 309 includes a power supply circuit that supplies electric power to the power source control unit 307, a power reception coil and the like. The power reception unit 309 receives, based on control by the power source control unit 307, electric power wirelessly transmitted by the power transmission device 200.

A power reception limiting unit 314 is a circuit that limits electric power to be received by the power reception unit 309. In a case where the power reception unit 309 continues power reception after charging of the power source unit 308 is completed, the received electric power is not charged in the second battery (storage battery) and the electric power transforms into heat. The heat might cause a rise in temperature that causes adverse effects on the power reception device 300. The power reception limiting unit 314 sets an energizing current in a power supply circuit of the power reception unit 309 to 0 so as to stop the power reception. Alternatively, the power reception limiting unit 314 limits a current amount so that rise in temperature that causes adverse effects on the power reception device 300 does not occur.

FIG. 3B illustrates the configuration of the power reception device 400 incapable of limiting power reception.

The power reception device 400 incapable of limiting power reception includes a control unit 401, a memory 402, a nonvolatile memory 403, a display unit 404, an operation unit 405, a wireless communication unit 406, a power source control unit 407, a power source unit 408, a power reception unit 409, and an internal bus 413. The respective units have functions similar to the functions of the control unit 301, the memory 302, the nonvolatile memory 303, the display unit 304, the operation unit 305, the wireless communication unit 306, the power source control unit 307, the power source unit 308, the power reception unit 309, and the internal bus 313 in FIG. 3A. Therefore, description thereof is omitted. A difference from the power reception device 300 capable of limiting power reception in FIG. 3A is that the power reception device 400 incapable of limiting power reception does not include the power reception limiting unit 314 in FIG. 3A.

Figure 4:
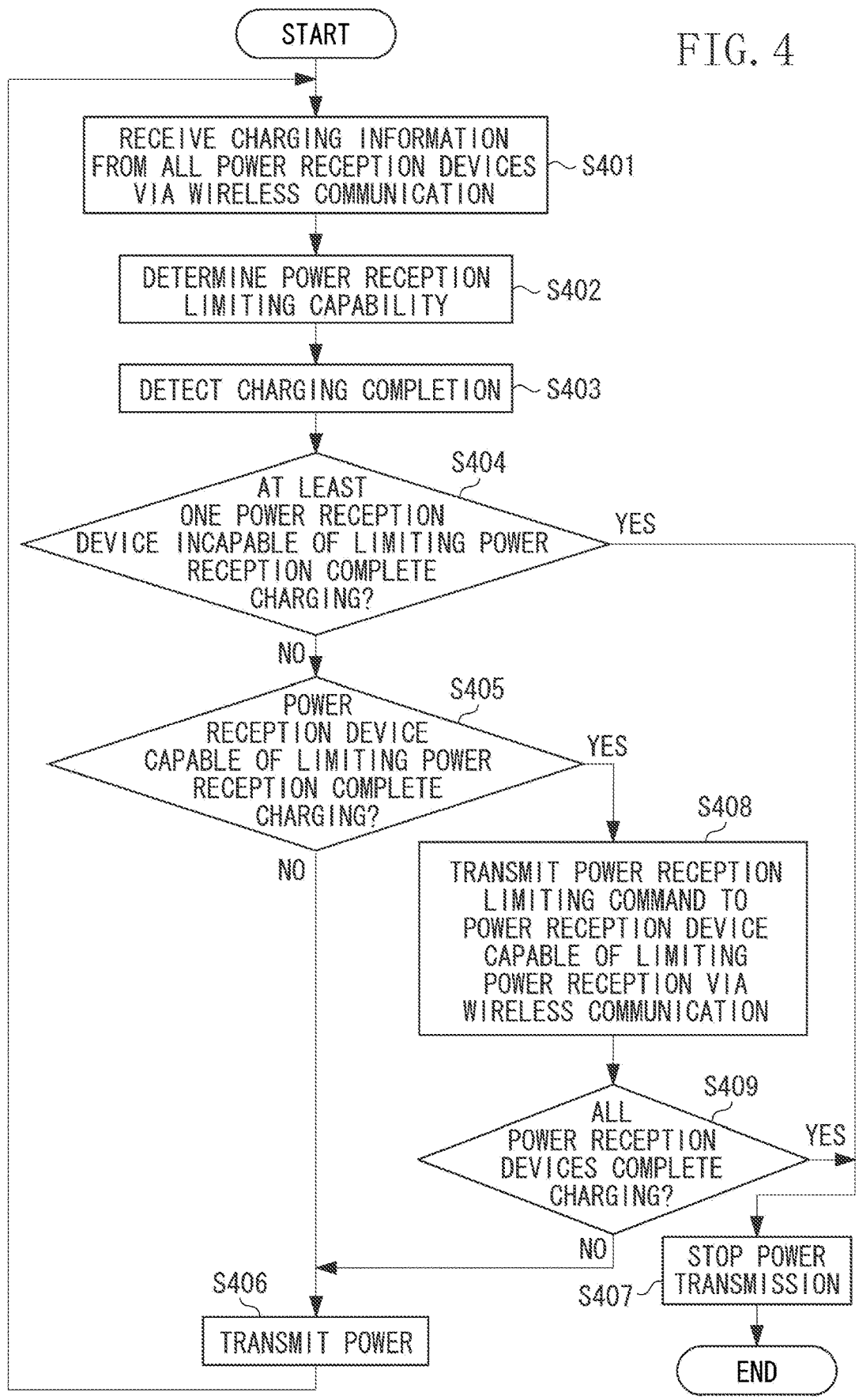
FIG. 4 is a flowchart illustrating charging control of the power transmission device according to the first exemplary embodiment.
Figure 5:
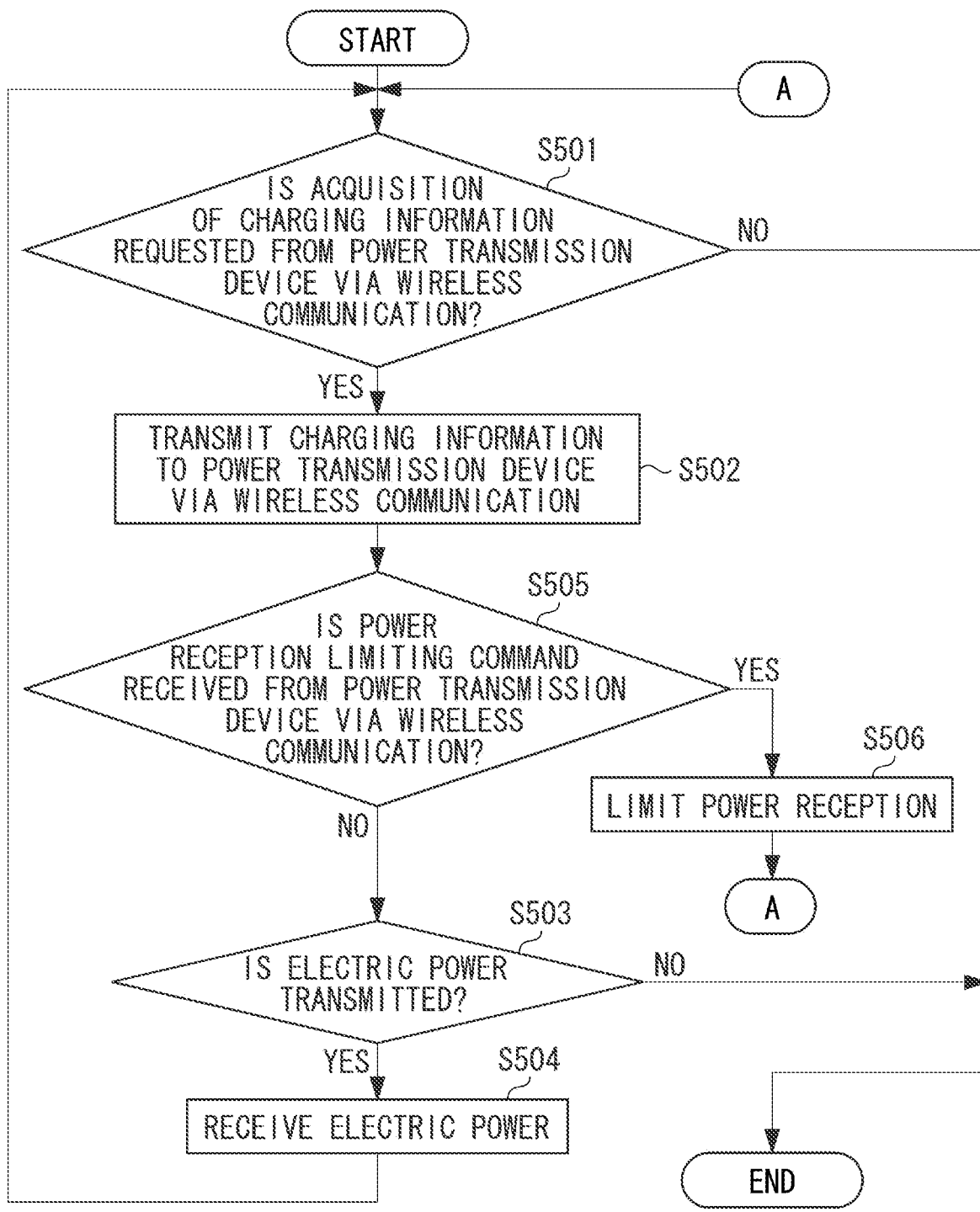
FIG. 5 is a flowchart illustrating charging control of a power reception device capable of limiting power reception according to the first exemplary embodiment.
Figure 6:
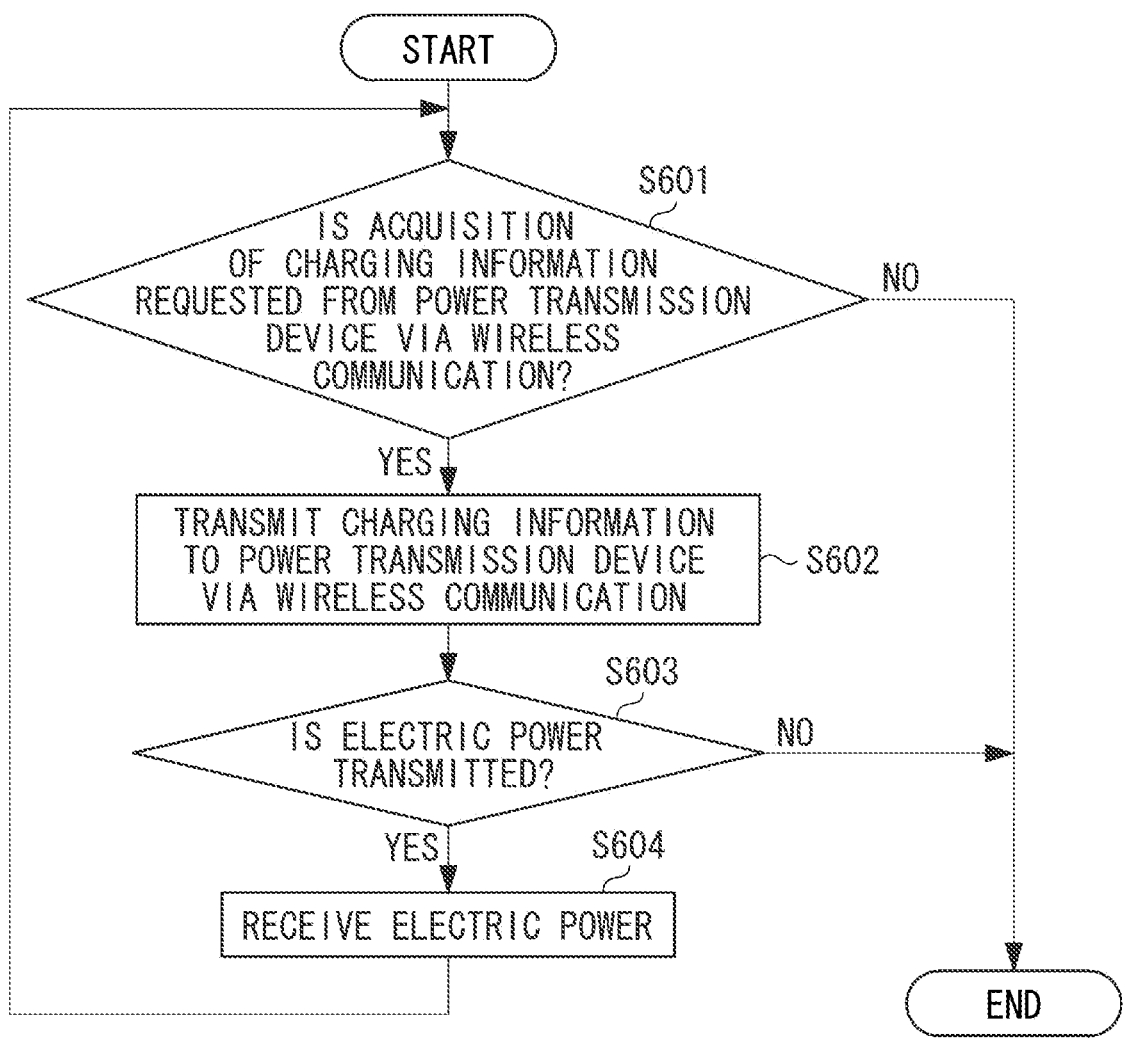
FIG. 6 is a flowchart illustrating charging control of a power reception device incapable of limiting power reception according to the first exemplary embodiment.

Operations of the power transmission device and the power reception device according to the first exemplary embodiment will be described below with reference to flowcharts in FIG. 4, FIG. 5, and FIG. 6. Respective steps in FIG. 4 are implemented in the power transmission device 200 in a manner that the control unit 201 loads programs stored in the nonvolatile memory 203 into the memory 202 and executes the programs. The control unit 201 controls the respective units of the power transmission device 200 including the charging control unit 212. Respective steps in FIG. 5 are implemented in the power reception device 300 capable of limiting power reception in a manner that the control unit 301 loads programs stored in the nonvolatile memory 303 into the memory 302 and executes the programs. Respective steps in FIG. 6 are implemented in the power reception device 400 incapable of limiting power reception in a manner that the control unit 401 loads programs stored in the nonvolatile memory 403 into the memory 402 and executes the programs. At start of the flowcharts in FIG. 4, FIG. 5, and FIG. 6, the power transmission device 200 is in a state prior to power transmission and stands by in a state capable of transmitting power.

Further, the power transmission device 200 is in a state that wireless communication connection is established between the power reception device 300 capable of limiting power reception and the power reception device 400 incapable of limiting power reception. The power reception device 300 capable of limiting power reception and the power reception device 400 incapable of limiting power reception are in a state prior to power reception and stand by in a state capable of receiving power.

FIG. 4 is the flowchart illustrating charging control of the power transmission device 200 according to the first exemplary embodiment.

In step S401, the charging control unit 212 transmits a charging information acquisition request to all the power reception devices via the wireless communication unit 206. The charging control unit 212 then receives charging information from all the power reception devices. The charging information includes information representing whether the power reception devices are incapable or capable of limiting power reception, information representing that the charging is completed or not completed, or a current remaining battery level, and a power receivable amount.

In step S402, the power reception limiting capability determination unit 210 refers to the charging information in step S401, and determines whether the power reception devices are incapable or capable of limiting power reception, respectively.

In step S403, the charging completion detection unit 211 refers to the charging information in step S401 to detect which power reception device has completed charging.

In step S404, the charging control unit 212 refers to a charging completion detection result in step S403 to determine whether at least one power reception device 400 incapable of limiting power reception has completed charging. If at least one power reception device 400 incapable of limiting power reception has not completed charging (No in step S404), the processing proceeds to step S405. If the at least one power reception device 400 has completed charging (Yes in step S404), the processing proceeds to step S407.

In step S405, the charging control unit 212 refers to the charging completion detection result in step S403 to determine whether the power reception device 300 capable of limiting power reception has completed charging. If the power reception device 300 capable of limiting power reception has not completed charging (No in step S405), the processing proceeds to step S406. If the power reception device 300 has completed charging (Yes in step S405), the processing proceeds to step S408.

In step S406, the charging control unit 212 transmits a power transmission execution signal for notifying all the power reception devices of execution of the power transmission via the wireless communication unit 206. The charging control unit 212, then, transmits a power transmission execution command to the power source control unit 207. The power source control unit 207 controls the power transmission unit 209 so that the power transmission unit 209 performs the power transmission on the power reception device 300 capable of limiting power reception and the power reception device 400 incapable of limiting power reception. If the power transmission is once performed, the power transmission continues until the charging control unit 212 transmits a power transmission stop command. Thereafter, if the power reception devices do not complete charging, step S401 to step S406 are repeated and the power transmission continues.

On the other hand, in a case where the processing proceeds from step S404 to step S407, in step S407 the charging control unit 212 transmits a power transmission stop signal for notifying all the power reception devices of stop of power transmission via the wireless communication unit 206. The charging control unit 212 transmits the power transmission stop command to the power source control unit 207. The power source control unit 207 controls the power transmission unit 209 so that the power transmission unit 209 stops the power transmission. That is, in a case where the plurality of power reception devices 400 incapable of limiting power reception is present, the power transmission is stopped at a time when at least one power reception device 400 completes charging. The processing ends, and the power transmission device 200 returns to a state at the start of the flowchart.

On the other hand, if the processing proceeds from step S405 to step S408, in step S408, the charging control unit 212 transmits a power reception limiting command to the power reception device 300 capable of limiting power reception that has completed charging via the wireless communication unit 206. This power reception device 300 thus limits power reception. That is, in a case where the plurality of power reception devices 300 capable of limiting power reception is present, every power reception device that completes charging limits power reception.

In step S409, the charging control unit 212 refers to a charging completion detection result of step S403 to determine whether all the power reception devices have completed charging. If not all the power reception devices have completed charging (No in step S409), the processing proceeds to step S406, and the power transmission continues. If all the power reception devices have completed charging (Yes in step S409), the processing proceeds to step S407, and the power transmission is stopped and the processing proceeds to END.

FIG. 5 is a flowchart illustrating the charging control in the power reception device 300 capable of limiting power reception according to the first exemplary embodiment.

In step S501, the control unit 301 determines whether a request to acquire charging information is received from the power transmission device 200 via the wireless communication unit 306. If the acquisition request is received (Yes in step S501), the processing proceeds to step S502. If the acquisition request is not received (No in step S501), the control unit 301 determines that charging control is not started, the processing ends. The power reception device 300 capable of limiting power reception, then, returns to a state at the start of the flowchart.

In step S502, the control unit 301 updates the charging information based on information about a current remaining battery level detected by the power source control unit 307. The control unit 301 transmits the charging information to the power transmission device 200 via the wireless communication unit 306.

In step S505, the control unit 301 determines whether a power reception limiting command is received from the power transmission device 200 via the wireless communication unit 306. If the power reception limiting command is received (Yes in step S505), the processing proceeds to step S506. If the power reception limiting command is not received (No in step S505), the processing proceeds to step S503.

In step S506, the control unit 301 transmits the power reception limiting command to the power source control unit 307. The power source control unit 307 controls the power reception limiting unit 314 so that the power reception limiting unit 314 limits the power reception. The processing then returns to step S501. If the processing proceeds from step S501 to END, the power reception limiting is canceled, and the power reception device 300 capable of limiting power reception returns to a state at the start of the flowchart.

In step S503, the control unit 301 determines whether the power transmission is to be performed. If receiving a power transmission execution signal from the power transmission device 200 via the wireless communication unit 306, the control unit 301 determines that the power transmission is to be executed. The processing then proceeds to step S504. If receiving a power transmission stop signal from the power transmission device 200 via the wireless communication unit 306, the control unit 301 determines that the power transmission is to be stopped. The processing then proceeds to END.

In step S504, the power source control unit 307 controls the power reception unit 309. The power reception unit 309 executes the power reception, and supplies the received power to the power source unit 308 to charge the power source unit 308. If the power reception is once executed, the power reception continues during continuation of the power transmission until the power reception is limited in step S506.

FIG. 6 is a flowchart illustrating charging control in the power reception device 400 incapable of limiting power reception according to the first exemplary embodiment.

Since step S601 to step S604 in FIG. 6 are similar to step S501 to step S504 in FIG. 5, description thereof is omitted (processing to be executed in a case where the power reception device 300 capable of limiting power reception is replaced by the power reception device 400 incapable of limiting power reception).

As described above, according to the first exemplary embodiment, in the multi device charging for the case where the power reception device 300 capable of limiting power reception and the power reception device 400 incapable of limiting power reception coexist, a rise in temperature can be prevented from causing adverse effects on the power reception device 400 incapable of limiting power reception.

If the power transmission device 200 continues the power transmission after the power reception device 400 incapable of limiting power reception completes charging, the electric power received by the power reception device 400 incapable of limiting power reception is not charged in the second battery (storage battery) and the electric power transforms into heat. Accordingly, a rise in temperature that causes adverse effects on the power reception device might occur. Therefore, in the configuration according to the first exemplary embodiment, in a case where the power transmission device 200 determines that at least one power reception device 400 incapable of limiting power reception has completed charging, the power transmission is stopped. That is, in the case where the plurality of power reception devices 400 incapable of limiting power reception is present, the power transmission is stopped at a time when at least one device completes charging. This configuration can prevent a rise in temperature that causes adverse effects on the power reception devices 400 incapable of limiting power reception.

Further, in a case where the power transmission device 200 detects that the power reception device 300 capable of limiting power reception has completed charging, the power transmission device 200 transmits a power reception limiting command to the power reception device 300 capable of limiting power reception via wireless communication. In such a manner, the power reception is limited. That is, in the case where the plurality of power reception devices 300 capable of limiting power reception is present, each power reception device that completes charging limits the power reception. This configuration can prevent a rise in temperature that causes adverse effects on the power reception devices 300 capable of limiting power reception.

Further, the power transmission device 200 is configured to continue the power transmission even after the power reception is limited in each power reception device that completes charging among the plurality of power reception devices 300 capable of limiting power reception. The power transmission continues until all the power reception devices or at least one power reception device incapable of limiting power reception completes charging. As a result, the charging can be controlled so that as many power reception devices as possible complete charging before the power transmission is stopped.

The first exemplary embodiment has mainly described the multiple device charging in the case where the power reception device 300 capable of limiting power reception and the power reception device 400 incapable of limiting power reception coexist. However, various embodiments of the present disclosure can be applied also to multiple device charging in a case where only the plurality of power reception devices 300 capable of limiting power reception is present, or multiple device charging in a case where only the plurality of power reception devices 400 incapable of limiting power reception is present. Therefore, the same charging control flowchart can be applied to the multiple device charging cases regardless of whether the power reception device 300 capable of limiting power reception and the power reception device 400 incapable of limiting power reception coexist or not.

According to the first exemplary embodiment, the configuration is such that the antenna of the wireless communication unit and the power transmission coil of the power transmission unit or the power reception coil of the power reception unit are provided separately. However, the antenna of the wireless communication unit and the power transmission coil of the power transmission unit or the power reception coil of power reception unit may be provided as a common unit. In this way, various embodiments of the present disclosure can be applied even to wireless charging systems having different configurations in a magnetic resonance method. An example of the wireless charging standard is a near field communication (NFC) method.

At the start of the flowcharts in FIG. 4, FIG. 5, and FIG. 6, wireless communication is established between the power transmission device 200 and the power reception device 300 capable of limiting power reception and between the power transmission device 200 and the power reception device 400 incapable of limiting power reception. However, in respective steps in the flowcharts of FIG. 4, FIG. 5, and FIG. 6, the connection may be established every time the wireless communication is performed. This configuration enables the multiple device charging without limitation even in a case where a maximum number of devices that can be simultaneously connected via wireless communication is limited.

A second exemplary embodiment will describe an example of the multiple device charging for the case where a power reception device capable of limiting power reception and a power reception device incapable of limiting power reception coexist. In this example, the power reception device makes charging control of the wireless charging system.

Figure 7:
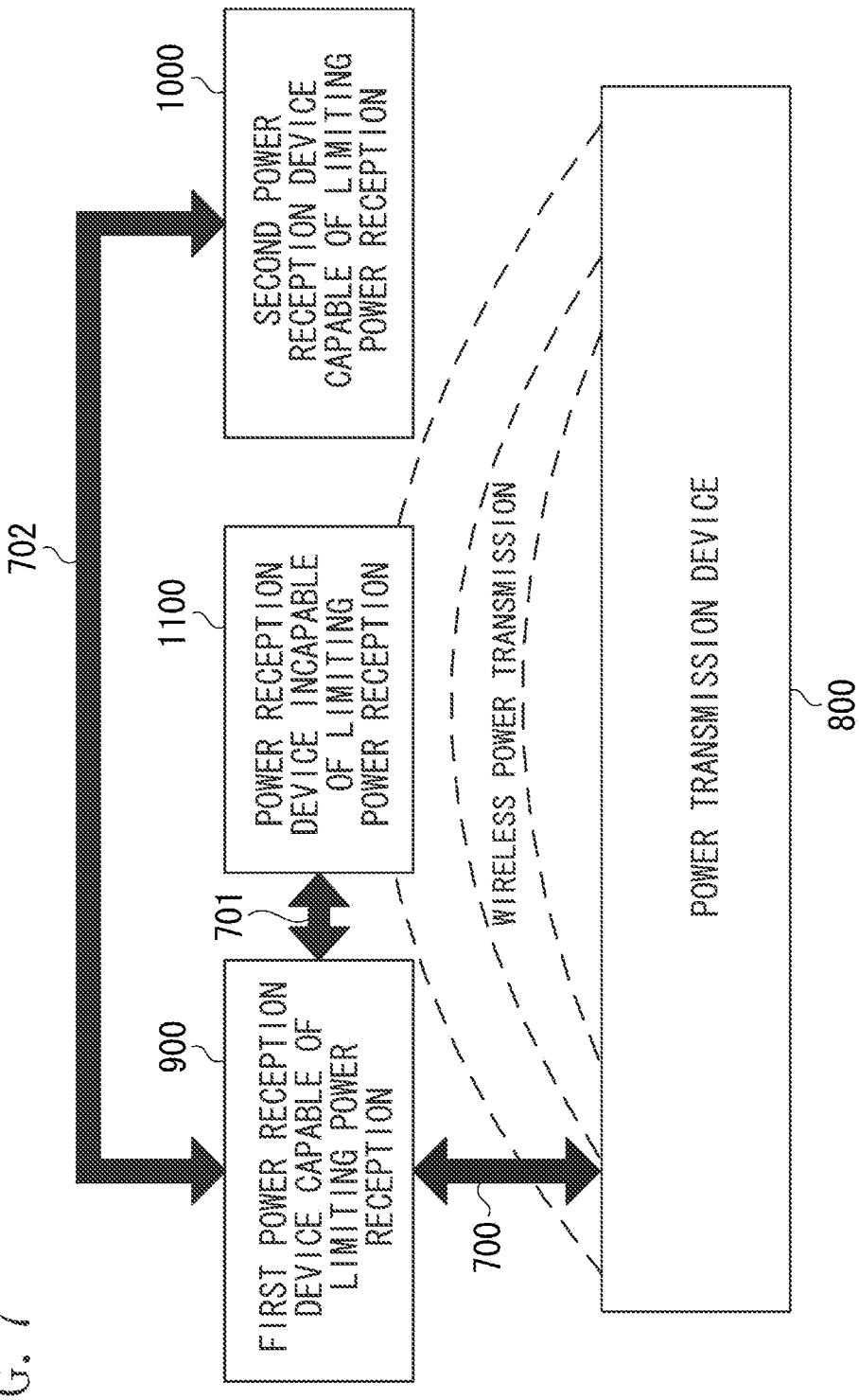
FIG. 7 is a diagram illustrating charging control of the wireless charging system according to a second exemplary embodiment.

FIG. 7 is a diagram illustrating the charging control of the wireless charging system according to the second exemplary embodiment.

The wireless charging system includes a power transmission device 800, a first power reception device 900 capable of limiting power reception, a second power reception device 1000 capable of limiting power reception, and a power reception device 1100 incapable of limiting power reception. The power transmission device 800 wirelessly transmits electric power to the first power reception device 900 capable of limiting power reception, the second power reception device 1000 capable of limiting power reception, and the power reception device 1100 incapable of limiting power reception so that simultaneous charging can be performed. In the second exemplary embodiment, the power transmission device 800 does not include the power reception limiting capability determination unit 210, the charging completion detection unit 211, and the charging control unit 212 in FIG. 2. Therefore, the first power reception device 900 capable of limiting power reception makes charging control. FIG. 7 illustrates, as one example, a case where one second power reception device 1000 capable of limiting power reception and one power reception device 1100 incapable of limiting power reception are provided. However, numbers of the respective devices may be one or more. The first power reception device 900 capable of limiting power reception detects whether the first power reception device 900 itself has completed charging.

Further, the first power reception device 900 capable of limiting power reception detects whether the charging is completed by transmitting and receiving the charging information to and from the second power reception device 1000 capable of limiting power reception via a wireless communication 702. Further, the first power reception device 900 capable of limiting power reception determines whether the charging is completed by transmitting and receiving the charging information to and from the power reception device 1100 incapable of limiting power reception via wireless communication 701. In a case where the first power reception device 900 capable of limiting power reception detects that at least one power reception device 1100 incapable of limiting power reception has completed charging, this first power reception device 900 transmits a power transmission stop command to the power transmission device 800 via wireless communication 700. The power transmission is thus stopped.

Further, in a case where first power reception device 900 capable of limiting power reception detects that the second power reception device 1000 capable of limiting power reception has completed charging, this first power reception device 900 transmits a power reception limiting command to the second power reception device 1000 capable of limiting power reception via the wireless communication 702. The power reception is thus limited. Further, in a case where the first power reception device 900 capable of limiting power reception detects that the first power reception device 900 itself has completed charging, the first power reception device 900 limits the power reception of itself.

Figure 8:
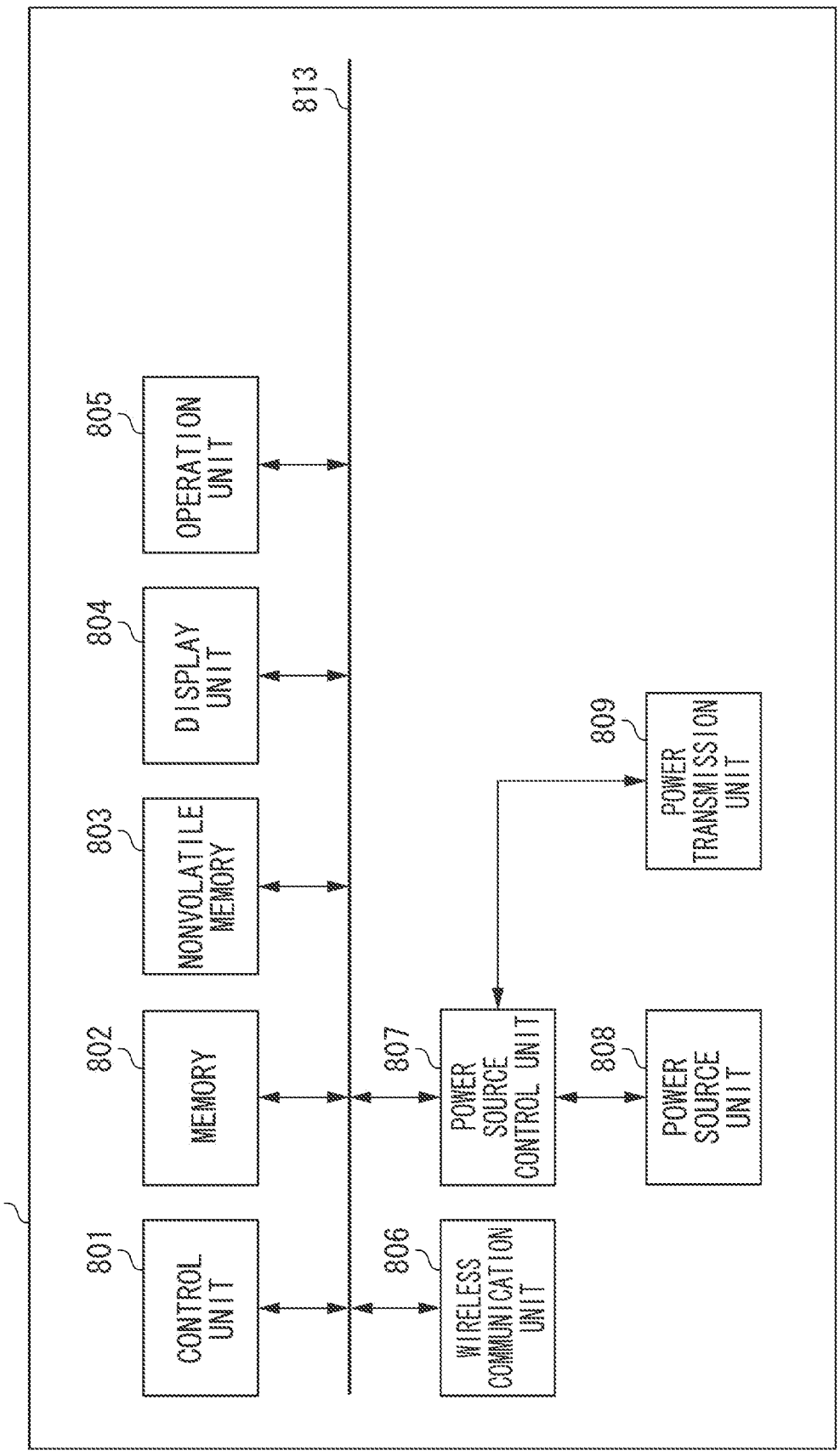
FIG. 8 is a block diagram illustrating a configuration of the power transmission device according to the second exemplary embodiment.

FIG. 8 is a block diagram illustrating a configuration of the power transmission device 800 according to the second exemplary embodiment.

The power transmission device 800 includes a control unit 801, a memory 802, a nonvolatile memory 803, a display unit 804, an operation unit 805, a wireless communication unit 806, a power source control unit 807, a power source unit 808, a power transmission unit 809, and an internal bus 813. The respective units have functions similar to the functions of the control unit 201, the memory 202, the nonvolatile memory 203, the display unit 204, the operation unit 205, the wireless communication unit 206, the power source control unit 207, the power source unit 208, the power transmission unit 209, and the internal bus 213 in FIG. 2. Description thereof is, therefore, omitted. A difference from the power transmission device 200 in FIG. 2 is that the power transmission device 800 does not include the power reception limiting capability determination unit 210, the charging completion detection unit 211, and the charging control unit 212 in FIG. 2.

FIGS. 9A, 9B, and 9C are block diagrams illustrating configurations of the power reception device according to the second exemplary embodiment. FIG. 9A illustrates the configuration of the first power reception device 900 capable of limiting power reception.

The first power reception device 900 capable of limiting power reception includes a control unit 901, a memory 902, a nonvolatile memory 903, a display unit 904, an operation unit 905, a power source control unit 907, a power source unit 908, a power reception unit 909, a power reception limiting unit 914, and an internal bus 913. The respective units have functions similar to the functions of the control unit 301, the memory 302, the nonvolatile memory 303, the display unit 304, the operation unit 305, the power source control unit 307, the power source unit 308, the power reception unit 309, the power reception limiting unit 314, and the internal bus 313 in FIG. 3A. Description thereof is, therefore, omitted. A difference from the power reception device 300 capable of limiting power reception in FIG. 3A is mainly described.

A wireless communication unit 906 has a function similar to the function of the wireless communication unit 306 in FIG. 3A. The wireless communication unit 906 further transmits and receives charging information to and from the power transmission device 800, the second power reception device 1000 capable of limiting power reception, and the power reception device 1100 incapable of limiting power reception via wireless communication.

A power reception limiting capability determination unit 910 determines whether the power reception devices are incapable or capable of limiting power reception. At this time, the power reception limiting capability determination unit 910 refers to charging information, received by the wireless communication unit 906, of the second power reception device 1000 capable of limiting power reception and the power reception device 1100 incapable of limiting power reception.

A charging completion detection unit 911 is a detection unit that detects completion of charging of the power reception devices complete charging. The charging completion detection unit 911 refers to the charging information, received by the wireless communication unit 906, of the second power reception device 1000 capable of limiting power reception and the power reception device 1100 incapable of limiting power reception, and a remaining battery level detected by the power source control unit 907. The charging completion detection unit 911 detects, based on these pieces of information, that the power reception device has completed charging.

A charging control unit 912 controls charging in the wireless charging system. In a case where the charging control unit 912 refers to a detection result in the charging completion detection unit 911 and detects that at least one power reception device 1100 incapable of limiting power reception has completed charging, the charging control unit 912 transmits a transmission stop command to the power transmission device 800 via the wireless communication unit 906 for stopping power transmission. Further, in a case where the charging control unit 912 detects that the second power reception device 1000 capable of limiting power reception has completed charging, the charging control unit 912 transmits a power reception limiting command to the second power reception device 1000 capable of limiting power reception via the wireless communication unit 906. The power reception is, therefore, limited in the second power reception device 1000 capable of limiting power reception. Further, in a case where the charging control unit 912 detects that the first power reception device 900 capable of limiting power reception, namely, the first power reception device 900 itself has completed charging, the charging control unit 912 transmits a power reception limiting command to the power source control unit 907. The power reception limiting unit 914 limits the power reception based on control by the power source control unit 907.

FIG. 9B illustrates the configuration of the second power reception device 1000 capable of limiting power reception.

The second power reception device 1000 capable of limiting power reception includes a control unit 1001, a memory 1002, a nonvolatile memory 1003, a display unit 1004, an operation unit 1005, a power source control unit 1007, a power source unit 1008, a power reception unit 1009, a power reception limiting unit 1014, and an internal bus 1013. The respective units have functions similar to the functions of the control unit 301, the memory 302, the nonvolatile memory 303, the display unit 304, the operation unit 305, the power source control unit 307, the power source unit 308, the power reception unit 309, the power reception limiting unit 314, and the internal bus 313 in FIG. 3A. Description thereof is, therefore, omitted. A difference from the power reception device 300 capable of limiting power reception in FIG. 3A is that a wireless communication unit 1006 has a function similar to the function of the wireless communication unit 306 in FIG. 3A. That is, the wireless communication unit 1006 transmits and receives charging information to and from the power transmission device 800 and the first power reception device 900 capable of limiting power reception via wireless communication.

FIG. 9C illustrates the configuration of the power reception device 1100 incapable of limiting power reception.

The power reception device 1100 incapable of limiting power reception includes, a control unit 1101, a memory 1102, a nonvolatile memory 1103, a display unit 1104, an operation unit 1105, a power source control unit 1107, a power source unit 1108, a power reception unit 1109, and an internal bus 1113. The respective units have functions similar to the functions of the control unit 401, the memory 402, the nonvolatile memory 403, the display unit 404, the operation unit 405, the power source control unit 407, the power source unit 408, the power reception unit 409, and the internal bus 413 in FIG. 3B. Description thereof is, therefore, omitted. A difference from the power reception device 400 incapable of limiting power reception in FIG. 3B is that a wireless communication unit 1106 has a function similar to the function of the wireless communication unit 406 in FIG. 3B. That is, the wireless communication unit 1106 transmits and receives charging information to and from the power transmission device 800 and the first power reception device 900 capable of limiting power reception via wireless communication.

Figure 12:
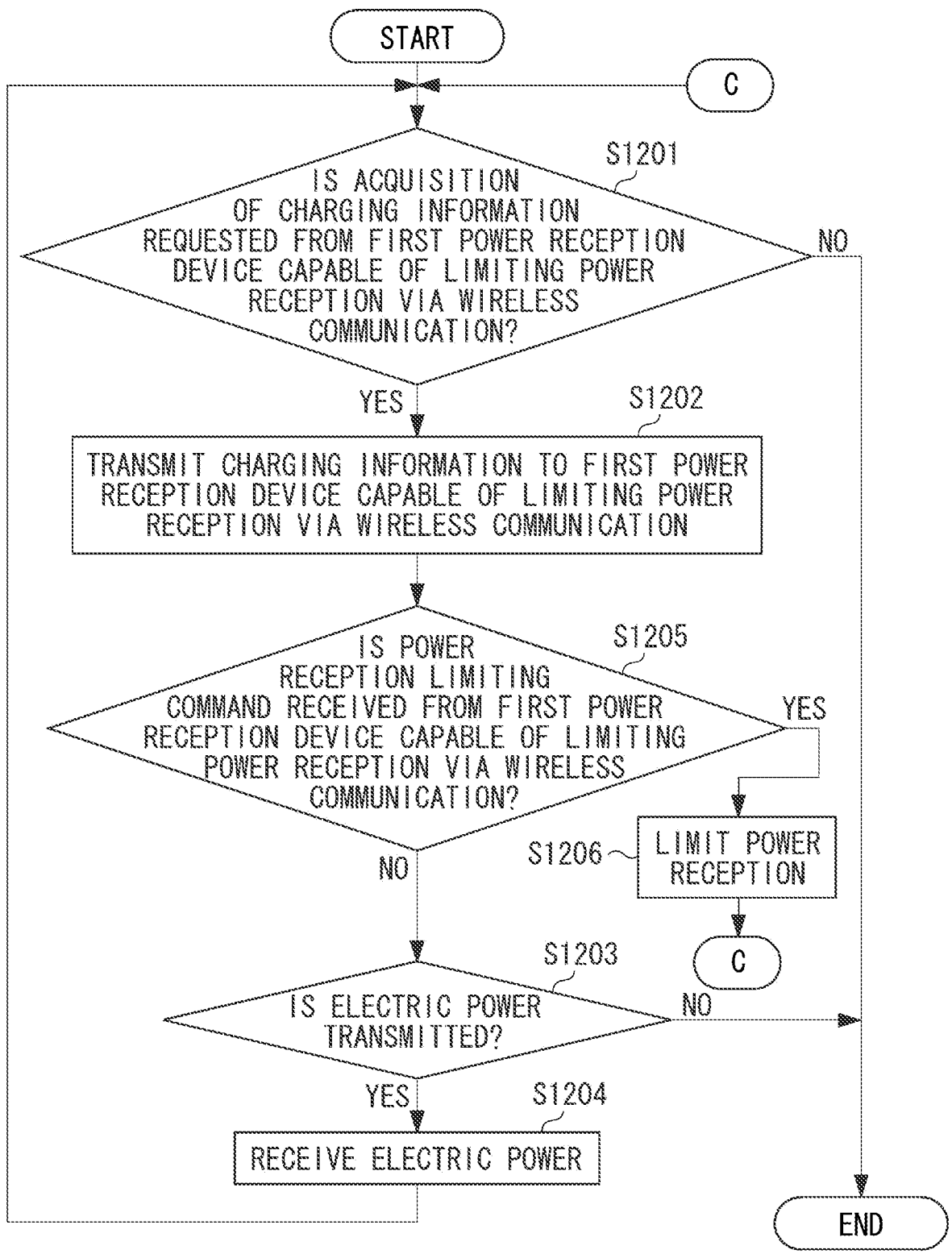
FIG. 12 is a flowchart illustrating charging control of a second power reception device capable of limiting power reception according to the second exemplary embodiment.
Figure 13:
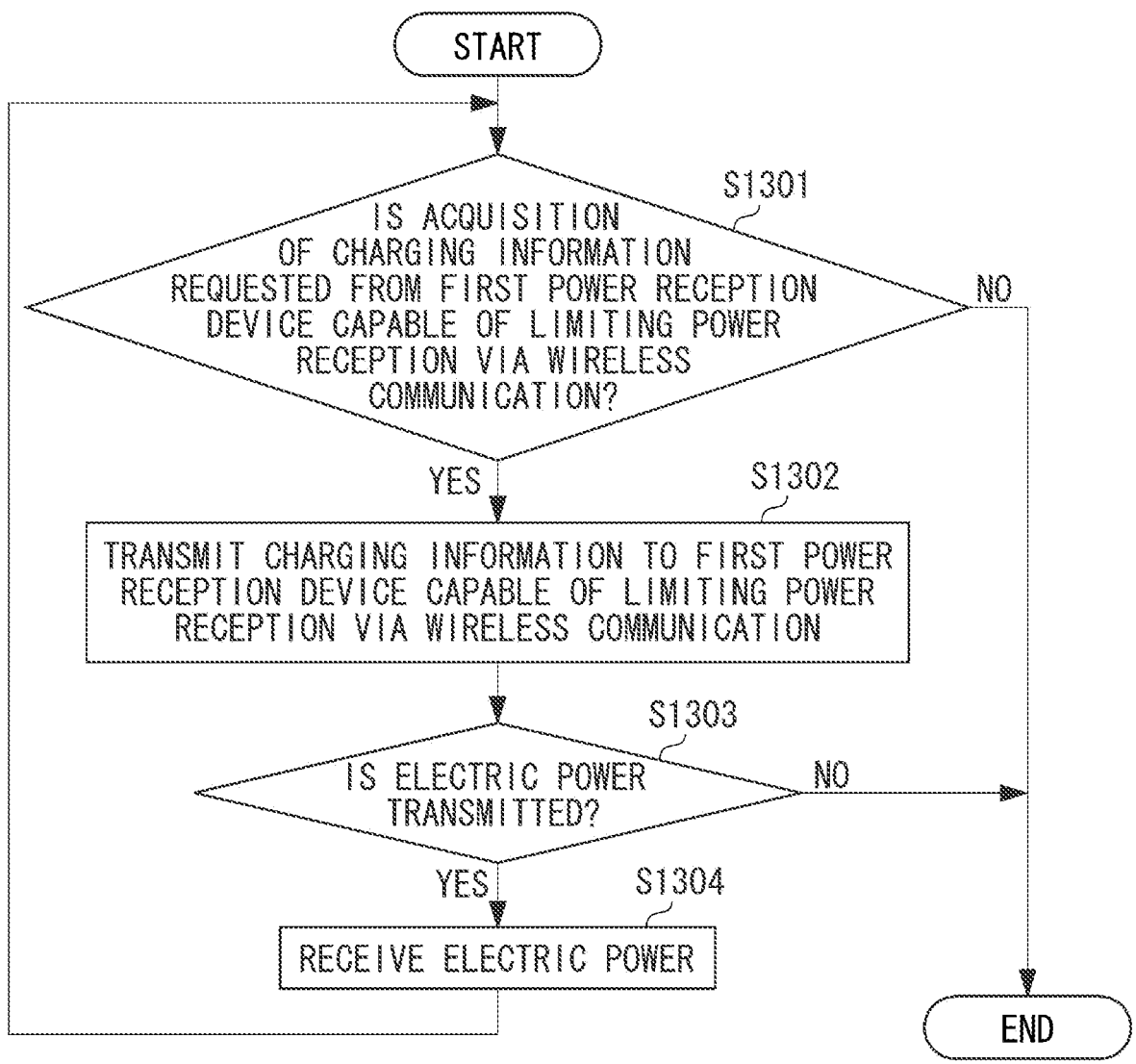
FIG. 13 is a flowchart illustrating charging control of the power reception device incapable of limiting power reception according to the second exemplary embodiment.

Operations of the power transmission device and the power reception devices according to the second exemplary embodiment will be described below with reference to flowcharts in FIG. 10, FIG. 11, FIG. 12, and FIG. 13. Respective steps in FIG. 10 are implemented in the power transmission device 800 in a manner that the control unit 801 loads programs stored in the nonvolatile memory 803 into the memory 802 and executes the programs. Respective steps in FIG. 11 are implemented in the first power reception device 900 capable of limiting power reception in a manner that the control unit 901 loads programs stored in the nonvolatile memory 903 into the memory 902 and executes the programs. The control unit 901 controls the respective units of the first power reception device 900 capable of limiting power reception including the charging control unit 912. Respective steps in FIG. 12 are implemented in the second power reception device 1000 capable of limiting power reception in a manner that the control unit 1001 loads programs stored in the nonvolatile memory 1003 into the memory 1002 and executes the programs. Respective steps in FIG. 13 are implemented in the power reception device 1100 incapable of limiting power reception in a manner that the control unit 1101 loads programs stored in the nonvolatile memory 1103 into the memory 1102 and executes the programs. At start of the flowcharts in FIG. 10, FIG. 11, FIG. 12, and FIG. 13, the power transmission device 800 is in a state prior to power transmission, and stands by in a state capable of transmitting power. The first power reception device 900 capable of limiting power reception, the second power reception device 1000 capable of limiting power reception, and the power reception device 1100 incapable of limiting power reception are in a state prior to power reception, and stand by in a state capable of receiving power. Further, the power transmission device 800 is in a state where wireless communication connection is established with respect to the first power reception device 900 capable of limiting power reception, the second power reception device 1000 capable of limiting power reception, and the power reception device 1100 incapable of limiting power reception. Further, the first power reception device 900 capable of limiting power reception is in a state where wireless communication connection is established with respect to the second power reception device 1000 capable of limiting power reception and the power reception device 1100 incapable of limiting power reception.

FIG. 10 is a flowchart illustrating charging control of the power transmission device 800 according to the second exemplary embodiment.

In step S1001, the control unit 801 determines whether a power transmission execution command has been received from the first power reception device 900 capable of limiting power reception via the wireless communication unit 806. If the power transmission execution command has been received (Yes in step S1001), the processing proceeds to step S1002. If the power transmission execution command is not received (No in step S1001), the determination is made that the power charging control is not started. The processing proceeds to END, and the power transmission device 800 returns to the state at the start of the flowchart.

In step S1002, the control unit 801 transmits a power transmission execution signal for notifying all the power reception devices of execution of the power transmission via the wireless communication unit 806. The control unit 801, then, transmits the power transmission execution command to the power source control unit 807. The power source control unit 807 controls the power transmission unit 809 so that the power transmission unit 809 transmits electric power to all the power reception devices. In a case where the power transmission is once executed, the power transmission continues until the control unit 801 receives a power transmission stop command.

In step S1003, the control unit 801 determines whether the control unit 801 has received a power transmission stop command from the first power reception device 900 capable of limiting power reception via the wireless communication unit 806. If the power transmission stop command has been received (Yes in step S1003), the processing proceeds to step S1004. If the power transmission stop command has not been received (No in step S1003), the processing returns to step S1001. Thereafter, step S1001 to step S1003 are repeated until the power transmission stop command is received.

In step S1004, the control unit 801 transmits a power transmission stop signal for notifying all the power reception devices of stop of the power transmission to via the wireless communication unit 806. The control unit 801 transmits the power transmission stop command to a power source control unit 807. The power source control unit 807 controls the power transmission unit 809 so that the power transmission unit 809 stops the power transmission. The processing, then, proceeds to END, and the power transmission device 800 returns to the state at the start of the flowchart.

FIG. 11 is a flowchart illustrating charging control of the first power reception device 900 capable of limiting power reception according to the second exemplary embodiment.

In step S1101, the charging control unit 912 transmits a charging information acquisition request to all the power reception devices via the wireless communication unit 906, and receives the charging information from all the power reception devices.

In step S1102, the power reception limiting capability determination unit 910 refers to the charging information in step S1101 to determine whether the respective power reception devices are incapable or capable of limiting power reception.

In step S1103, the charging completion detection unit 911 refers to the charging information in step S1101 to detect which power reception device has completed charging. Further, the charging completion detection unit 911 refers to a remaining battery level detected by the power source control unit 907 to detect whether the first power reception device 900 capable of limiting power reception has completed charging.

In step S1104, the charging control unit 912 refers to a charging completion detection result in step S1103 to determine whether at least one power reception device 1100 incapable of limiting power reception has completed charging. If at least one power reception device 1100 incapable of limiting power reception has not completed the charging (No in step S1104), the processing proceeds to step S1105. If the at least one power reception device 400 has completed the charging (Yes in step S1104), the processing proceeds to step S1109.

In step S1105, the charging control unit 912 refers to the charging completion detection result in step S1103 to determine whether the first power reception device 900 capable of limiting power reception or the second power reception device 1000 capable of limiting power reception has completed charging. If the charging is not complete (No in step S1105), the processing proceeds to step S1106. If the charging is complete (Yes in step S1105), the processing proceeds to step S1110.

In step S1106, the charging control unit 912 transmits a power transmission execution command to the power transmission device 800 via the wireless communication unit 906 so that the power transmission device 800 transmits electric power.

In step S1107, the charging control unit 912 determines whether the power reception is being currently limited in step S1111, described below. If the power reception is not being currently limited (No in step S1107), the processing proceeds to step S1108. If the power reception is being currently limited (Yes in step S1107), the processing returns to step S1101 without execution of power reception.

In step S1108, the charging control unit 912 receives a power transmission execution signal from the power transmission device 800 via the wireless communication unit 906. The power source control unit 907 controls the power reception unit 909 so that the power reception unit 909 receives electric power and supplies the received power to the power source unit 908. In such a manner, charging is performed. In a case where the power reception is once performed, the power reception continues while the power transmission continues unless the power reception is limited in step S1111, described below.

On the other hand, if the processing proceeds from step S1104 to step S1109, in step S1109 the charging control unit 912 transmits a power transmission stop command to the power transmission device 800 via the wireless communication unit 906. The power transmission is thus stopped. That is, in a case where the plurality of power reception devices 1100 incapable of limiting power reception is present, the power transmission is stopped at a time when at least one device completes charging. The processing proceeds to END, and the first power reception device 900 capable of limiting power reception returns to the state at the start of the flowchart. At this time, if the power reception is being currently limited in step S1111, described below, the power reception limit is canceled.

On the other hand, when the processing proceeds from step S1105 to step S1110, in step S1110 the charging control unit 912 refers to a charging completion detection result in step S1103 to determine whether the first power reception device 900 capable of limiting power reception has completed charging. If the charging is completed (Yes in step S1110), the processing proceeds to step S1111. If not completed (No in step S1110), the processing proceeds to step S1112.

In step S1111, the charging control unit 912 transmits a power reception limiting command to the power source control unit 907. The power source control unit 907 controls the power reception limiting unit 914 so that the power reception limiting unit 914 limits power reception.

In step S1112, the charging control unit 912 refers to the charging completion detection result in step S1103 to determine whether the second power reception device 1000 capable of limiting power reception has completed charging. If the charging is complete (Yes in step S1112), the processing proceeds to step S1113. If not complete (No in step S1112), the processing proceeds to step S1114.

In step S1113, the charging control unit 912 transmits a power reception limiting command to the second power reception device 1000 capable of limiting power reception that has completed charging via the wireless communication unit 906 so that the power reception is limited. That is, in a case where the plurality of second power reception devices 1000 capable of limiting power reception is present, the power reception is limited for each respective power reception device that has completed charging.

In step S1114, the charging control unit 912 refers to the charging completion detection result in step S1103 to determine whether all the power reception devices have completed charging. If not all the power reception devices have completed charging (No in step S1114), the processing proceeds to step S1106 and the power transmission is continued. If all the power reception devices have completed charging (Yes in step S1114), the processing proceeds to step S1109, and the power transmission is stopped. The processing then proceeds to END.

FIG. 12 is a flowchart illustrating charging control of the second power reception device 1000 capable of limiting power reception according to the second exemplary embodiment.

In step S1201, the control unit 1001 determines whether a charging information acquisition request is received from the first power reception device 900 capable of limiting power reception via the wireless communication unit 1006. If the acquisition request is received (Yes in step S1201), the processing proceeds to step S1202. If the acquisition request is not received (No in step S1201), the control unit 1001 determines that the charging control is not started. The processing thus proceeds to END, and the second power reception device 1000 capable of limiting power reception returns to the state at the start of the flowchart.

In step S1202, the control unit 1001 updates the charging information based on information about current remaining battery level detected by the power source control unit 1007. The control unit 1001 transmits the charging information to the first power reception device 900 capable of limiting power reception via the wireless communication unit 1006.

In step S1205, the control unit 1001 determines whether a power reception limiting command is received from the first power reception device 900 capable of limiting power reception via the wireless communication unit 1006. If the power reception limiting command is received (Yes in step S1205), the processing proceeds to step S1206. If power reception limiting command is not received (No in step S1205), the processing proceeds to step S1203.

In step S1206, the control unit 1001 transmits a power reception limiting command to the power source control unit 1007. The power source control unit 1007 controls the power reception limiting unit 1014 so that the power reception is limited, and the processing returns to step S1201. When the processing proceeds from step S1201 to END, the power reception limitation is canceled. The second power reception device 1000 capable of limiting power reception thus returns to the state at the start of the flowchart.

In step S1203, the control unit 1001 determines whether electric power is transmitted. In a case where a power transmission execution signal is received from the power transmission device 800 via the wireless communication unit 1006, the control unit 1001 determines that the electric power is to be transmitted. The processing then proceeds to step S1204. In a case where a power transmission stop signal is received from the power transmission device 800 via the wireless communication unit 1006, the control unit 1001 determines that the power transmission is to be stopped. The processing then proceeds to END.

In step S1204, the power source control unit 1007 controls the power reception unit 1009 so that the power reception unit 1009 receives the electric power. The power reception unit 1009 supplies the received power to the power source unit 1008 so as to charge the power source unit 1008. In a case where electric power is once received, the power reception continues while the power transmission continues unless the power reception is limited in step S1206.

FIG. 13 is a flowchart illustrating charging control of the power reception device 1100 incapable of limiting power reception according to the second exemplary embodiment.

Since step S1301 to step S1304 in FIG. 13 are similar to step S1201 to step S1204 in FIG. 12, description thereof is omitted (processing in a case where the second power reception device 1000 capable of limiting power reception is replaced by the power reception device 1100 incapable of limiting power reception).

As described above, the second exemplary embodiment can produce effects similar to the effects in the first exemplary embodiment and further can produce the following effect.

In the multiple device charging for the case where the power reception device capable of limiting power reception and the power reception device incapable of limiting power reception coexist, the power transmission device controls the charging of the wireless charging system in the configuration according to the first exemplary embodiment. However, in the configuration according to the second exemplary embodiment, the power reception device controls the charging of the wireless charging system. Therefore, the power reception device has a charging control function for preventing a rise in temperature causing adverse effects on the power reception device incapable of limiting power reception. For this reason, even if the power transmission device without such a charging control function is used, the charging can be performed safely.

In the configuration according to the second exemplary embodiment, the power reception device capable of limiting power reception has the charging control function, but the power reception device incapable of limiting power reception may have the charging control function. Therefore, various embodiments of the present disclosure can be applied to all power reception devices whether the power reception devices are capable or incapable of limiting power reception.

In the configuration according to the second exemplary embodiment, the first power reception device 900 capable of limiting power reception directly and wirelessly communicates with all the power reception devices to acquire charging information. However, a configuration may be such that the power transmission device 800 wirelessly communicates with all the power reception devices to acquire charging information, and then the first power reception device 900 capable of limiting power reception acquires the charging information of all the power reception devices from the power transmission device 800. As a result, the wireless communication is not necessary between the power reception devices, and a route for the wireless communication can be eliminated. Therefore, even if a maximum number of devices that can wirelessly communicate simultaneously is limited, multiple device charging can be performed without limitation.

A third exemplary embodiment will describe an example of multiple device charging for the case where the power reception device capable of limiting power reception and the power reception device incapable of limiting power reception coexist. In this example, in a case where power transmission is stopped because the power reception device incapable of limiting power reception has completed charging but a power reception device which has not completed charging is present, the power transmission device makes a notification about a cause of the stop of power transmission.

A block diagram illustrating the configurations of the power transmission device and the power reception device according to the third exemplary embodiment is similar to FIG. 2, FIGS. 3A, and 3B described in the first exemplary embodiment. Description thereof is thus omitted. A charging control flowchart according to the third exemplary embodiment is different from the charging control flowchart according to the first exemplary embodiment in some processing.

FIG. 14 is a flowchart illustrating charging control of the power transmission device 200 according to the third exemplary embodiment.

Since step S1401 to step S1409 in FIG. 14 are similar to step S401 to step S409 in FIG. 4, description thereof is omitted. Step S1415 and step S1416 that are not provided in the first exemplary embodiment will be mainly described.

In step S1415, the charging control unit 212 refers to a charging completion detection result in step S1403 to determine whether all the power reception devices have completed charging. If not all of the power reception devices have completed charging (No in step S1415), the processing proceeds to step S1416. If all the power reception devices have completed charging (Yes in step S1415), the processing proceeds to step S1407.

In step S1416, the charging control unit 212 transmits, to the control unit 201, a command to make a notification about a cause of power transmission stop. The control unit 201 displays, on the display unit 204, a message indicating that power transmission is stopped because the power reception device 400 incapable of limiting power reception has completed charging.

As described above, the third exemplary embodiment produces the effects similar to the effects in the first exemplary embodiment, and further produces the following effect.

In the multiple device charging for the case where the power reception device 300 capable of limiting power reception and the power reception device 400 incapable of limiting power reception coexist, there is a case where power transmission is stopped because the power reception device 400 incapable of limiting power reception has completed charging and a power reception device that has not yet completed charging is present. In such a case, a user cannot understand why the power transmission stops although the power transmission is not complete. Further, the user has no idea as to how to complete charging of the power reception device that has not yet completed charging. In the configuration according to the third exemplary embodiment, therefore, a message indicating that the power transmission is stopped because the power reception device 400 incapable of limiting power reception has completed charging is displayed on the display unit 204. In this way, the user can understand why the power transmission stops although the charging is not completed. Further, the user can understand that the power transmission needs to be restarted by removing the power reception device 400 incapable of limiting power reception that has completed charging in order to complete the charging of the power reception device that has not completed charging.

In the configuration according to the third exemplary embodiment, the display unit 204 displays the message indicating that power transmission is stopped because the power reception device 400 incapable of limiting power reception has completed charging. However, the present invention is not limited to this example. That is, the notification may be anything that lets the user know why power transmission is stopped although the charging is not completed and a next operation to be performed. For example, the configuration may be such that the display unit 204 displays a message that instructs the user to remove the power reception device 400 incapable of limiting power reception that has completed charging. In this way, the user can more clearly understand the next operation to be performed.

In the configuration according to the third exemplary embodiment, the display unit 204 displays the notification about a cause of the stop of power transmission. However, the power transmission device may transmit a cause of stop of power transmission to the power reception device via wireless communication so that the cause may be displayed on the display unit of the power reception device. By providing the display of the cause on the display units of both the power transmission device and the power reception device, the user can easily find that the power transmission device has stopped power transmission. Further, various embodiments of the present disclosure can be applied also to a power transmission device without a display unit. Further, the cause of the stop of power transmission may be displayed only on the display unit of the power reception device 400 incapable of limiting power reception that has completed charging. This makes it clear that it is necessary to remove the power reception device 400 incapable of limiting power reception that has completed charging.

Various types of notification means, such as notification using lighting, blinking, turning-off, and a change in lighting color of light-emitting diode (LED), notification using a sound, and notification using vibration, may be used as long as such means can notify the user about a cause of stop of power transmission. Therefore, the present invention can be applied to the power transmission device and the power reception device not provided with the display unit.

A fourth exemplary embodiment will describe an example of the multiple device charging for the case where the power reception device capable of limiting power reception and the power reception device incapable of limiting power reception coexist. In this example, in a case where power transmission is stopped because the power reception device incapable of limiting power reception has completed charging but a power reception device that has not completed charging is present, the power reception device makes a notification about a cause of stop of power transmission.

A block diagram illustrating configurations of the power transmission device and the power reception device according to the fourth exemplary embodiment is similar to the block diagrams in FIG. 8, FIGS. 9A, 9B, and 9C described in the second exemplary embodiment. Description thereof is thus omitted. A charging control flowchart in the fourth exemplary embodiment is different from the charging control flowchart in the second exemplary embodiment in some processing.

Figure 15B:
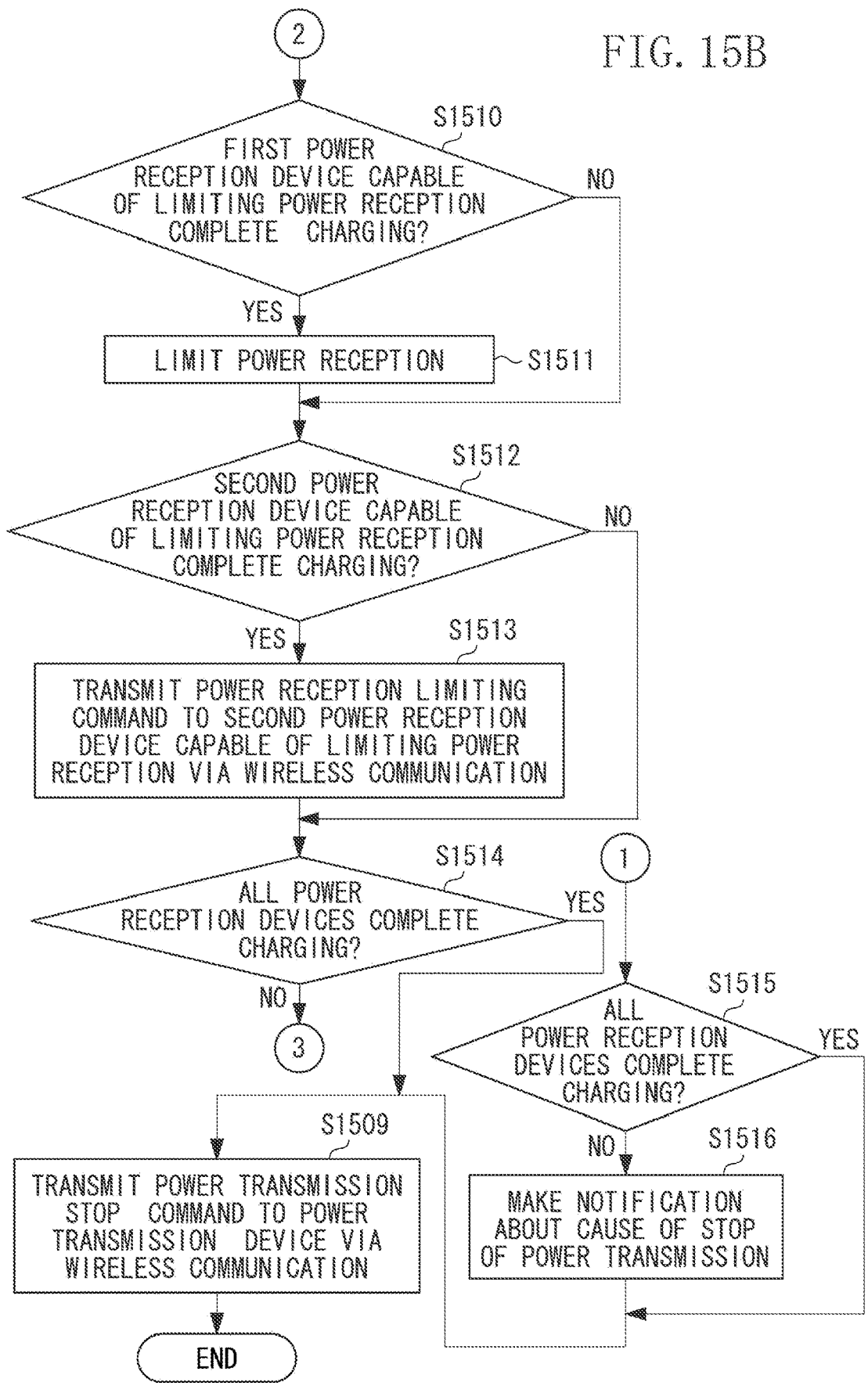
FIG. 15 (including FIG. 15A and FIG. 15B) is a flowchart illustrating charging control of the first power reception device capable of limiting power reception according to a fourth exemplary embodiment.

FIG. 15 is a flowchart illustrating charging control of the first power reception device 900 capable of limiting power reception according to the fourth exemplary embodiment.

Since step S1501 to step S1514 in FIG. 15 are similar to step S1101 to step S1114 in FIG. 11, description thereof is omitted. Step S1515 and step S1516 that are not provided in the second exemplary embodiment will be mainly described.

In step S1515, the charging control unit 912 refers to a charging completion detection result of step S1503 to determine whether all the power reception devices have completed charging. If not all the power reception devices have completed charging (No in step S1515), the processing proceeds to step S1516. If all the power reception devices have completed charging (Yes in step S1515), the processing proceeds to step S1509.

In step S1516, the charging control unit 912 transmits, to the control unit 901, a command to make a notification about a cause of stop of power transmission. The control unit 901 displays, on the display unit 904, a message indicating that the power transmission has stopped because the power reception device 1100 incapable of limiting power reception has completed charging.

As described above, in the configuration according to the fourth exemplary embodiment, processing for making a notification about a cause of stop of power transmission similar to step S1415 to step S1416 in FIG. 14 according to the second exemplary embodiment is executed. As a result, the fourth exemplary embodiment can produce effects similar to the effects in the second exemplary embodiment and the third exemplary embodiment. That is, the user can understand why the power transmission stops although the charging is not completed. Further, the user can understand a next operation to be performed in order to complete charging of a power reception device that does not complete charging.

In a fifth exemplary embodiment, if, in the respective configurations according to the above-described exemplary embodiments, the charging information does not include information representing whether the power reception devices are incapable or capable of limiting power reception, the power reception limiting capability determination unit determines that the power reception device is a power reception device incapable of limiting power reception. As a result, the fifth exemplary embodiment can produce effects similar to the effects in the above exemplary embodiments, and further can produce the following effect. That is, various embodiments of the present disclosure can be applied to a power reception device even if it is unclear whether this power reception device is incapable or capable of limiting power reception. This application can prevent a rise in temperature that causes adverse effects on the power reception device incapable of limiting power reception.

Further, the above-described exemplary embodiments have described, as an example, the case where various embodiments of the present disclosure are applied to the power transmission device and the power reception device. However, the present invention is not limited to this example. That is, various embodiments of the present disclosure can be applied to various types of devices, such as digital single-lens reflex cameras, digital video cameras, tablet type, notebook type, and desktop type personal computers, mobile telephone terminals, image viewers, and music players, that can construct the wireless charging system.

Further, exemplary embodiments of various embodiments of the present disclosure have been described, but the present invention is not limited to these specific exemplary embodiments. Therefore, various modifications which do not depart from the scope of the present invention are included in the present invention. Further, the above-described exemplary embodiments are described only as examples, and the respective exemplary embodiments may be suitably combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments of the present disclosure have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126237, filed Jun. 28, 2017, which is hereby incorporated by reference herein in its entirety.

What is claimed is:

1. A power transmission device comprising:
a power transmission unit configured to transmit electric power to a plurality of power reception devices;
a communication unit configured to exchange charging information with the plurality of power reception devices;
a determination unit configured to determine, based on the charging information, for each of the plurality of power reception devices, whether the power reception device is capable of limiting power reception;
a detection unit configured to detect, based on the charging information, for each of the plurality of power reception devices, completion of charging of the power reception device; and
a control unit configured to perform control so that power transmission is stopped in a case where the detection unit detects that at least one power reception device incapable of limiting power reception has completed charging.

2. The power transmission device according to claim 1, wherein, in a case where the detection unit detects that at least one power reception device capable of limiting power reception has completed charging, the control unit controls the communication unit so that the communication unit transmits an instruction for limiting power reception to the power reception device capable of limiting power reception that has completed charging.

3. The power transmission device according to claim 1, wherein, in a case where the detection unit detects that at least one power reception device capable of limiting power reception has completed charging, the control unit controls the communication unit so that the communication unit transmits an instruction for limiting power reception to the power reception device capable of limiting power reception that has completed charging, and continues power transmission to the other power reception devices that have not completed charging.

4. The power transmission device according to claim 1, wherein, in the case where the detection unit detects that at least one power reception device incapable of limiting power reception has completed charging, power transmission to the plurality of power reception devices is stopped even if the other power reception devices of the plurality of power reception devices have not completed charging.

5. The power transmission device according to claim 1, further comprising a notification unit configured to provide a notification about stop of power transmission based on completion of charging in the power reception device incapable of limiting power reception in a case where the control unit stops the power transmission and one or more power reception devices of the plurality of power reception devices have not yet completed charging.

6. The power transmission device according to claim 1, further comprising a display unit,
wherein the communication unit provides a notification about stop of power transmission by displaying a message on the display unit.

7. The power transmission device according to claim 6, wherein the message includes a message instructing removal of the power reception device incapable of limiting power reception.

8. The power transmission device according to claim 1, wherein in a case where the charging information does not include information for determining whether the plurality of power reception devices is capable or incapable of limiting power reception, the determination unit determines that the plurality of power reception devices is incapable of limiting power reception.

9. A method for controlling a power transmission device, comprising:
transmitting electric power to a plurality of power reception devices;
communicating with the plurality of power reception devices for exchanging charging information;
determining, based on the charging information, for each of the plurality of power reception devices, whether the power reception device is capable of limiting power reception;
detecting, based on the charging information, for each of the plurality of power reception devices, completion of charging of the power reception device; and
performing control so that power transmission is stopped in a case where it is detected that at least one power reception device incapable of limiting power reception has completed charging.

10. A non-transitory computer-readable storage medium which stores a program for causing a computer to execute a method, the method comprising:
transmitting electric power to a plurality of power reception devices;
communicating with the plurality of power reception devices for exchanging charging information;
determining, based on the charging information, for each of the plurality of power reception devices, whether the power reception device is capable of limiting power reception;
detecting, based on the charging information, for each of the plurality of power reception devices, completion of charging of the power reception device; and
performing control so that power transmission is stopped in a case where it is detected that at least one power reception device incapable of limiting power reception has completed charging.

* * * * *